United States Patent
Strait

(10) Patent No.: US 9,036,461 B2
(45) Date of Patent: *May 19, 2015

(54) LTE—ADVANCED TRANSMIT DIVERSITY DECODERS

(71) Applicant: Metanoia Communications Inc., Hsinchu (TW)

(72) Inventor: Jeffrey C. Strait, Reno, NV (US)

(73) Assignee: Metanoia Communications Inc. (TW)

( * ) Notice: Subject to any disclaimer, the term of this patent is extended or adjusted under 35 U.S.C. 154(b) by 0 days.

This patent is subject to a terminal disclaimer.

(21) Appl. No.: 14/014,337

(22) Filed: Aug. 29, 2013

(65) Prior Publication Data

US 2015/0029831 A1 Jan. 29, 2015

Related U.S. Application Data

(63) Continuation of application No. 13/467,865, filed on May 9, 2012, now Pat. No. 8,553,800.

(51) Int. Cl.
| | |
|---|---|
| *H04J 11/00* | (2006.01) |
| *H04L 1/02* | (2006.01) |
| *H04B 7/04* | (2006.01) |
| *H04L 25/03* | (2006.01) |
| *H04L 25/02* | (2006.01) |
| *H04B 7/08* | (2006.01) |
| *H04L 5/00* | (2006.01) |
| *H04L 27/26* | (2006.01) |

(52) U.S. Cl.
CPC ............... *H04J 11/0063* (2013.01); *H04L 1/02* (2013.01); *H04B 7/0413* (2013.01); *H04L 25/03* (2013.01); *H04L 25/0204* (2013.01); *H04L 27/2647* (2013.01); *H04B 7/046* (2013.01); *H04B 7/0882* (2013.01); *H04L 5/0007* (2013.01)

(58) Field of Classification Search
CPC .................................................... H04J 11/0063
See application file for complete search history.

(56) References Cited

U.S. PATENT DOCUMENTS

| | | | | |
|---|---|---|---|---|
| 8,553,800 | B1 * | 10/2013 | Strait | 375/267 |
| 2009/0034585 | A1 * | 2/2009 | Hua et al. | 375/130 |
| 2009/0129499 | A1 * | 5/2009 | Kwak et al. | 375/267 |
| 2011/0274152 | A1 * | 11/2011 | Seyama | 375/224 |
| 2011/0292827 | A1 * | 12/2011 | Li | 370/252 |

\* cited by examiner

*Primary Examiner* — Christopher Grey

(74) *Attorney, Agent, or Firm* — Han IP Corporation; Andy M. Han

(57) ABSTRACT

Various embodiments of a transmit diversity decoding techniques are provided. In one aspect, a method receives a first input that includes signals transmitted by M transmit antennas on C channels and received by N receive antennas, where M, N and C is each a positive integer greater than 1. The method also receives a second input that includes estimates of channel matrix elements. The method further generates an output that includes at least an estimate of a transmit signal transmitted by one of the M transmit antennas on one of the C channels based at least in part on the first and the second inputs.

6 Claims, 13 Drawing Sheets

LTE—ADVANCED TRANSMIT DIVERSITY DECODERS

CROSS REFERENCE TO RELATED PATENT APPLICATION

This application is a continuation, and claims the priority benefit, of U.S. patent application Ser. No. 13/467,865, filed May 9, 2012 and entitled "LTE-Advanced Transmit Diversity Decoders", which is herein incorporated by reference in its entirety.

BACKGROUND

1. Technical Field

The present disclosure relates to telecommunication and, more specifically, to wireless communication transmit diversity decoding.

2. Description of Related Art

The new 4G wireless technology standard termed Long Term Evolution-Advanced (LTE-A) utilizes the well-known modulation scheme known as orthogonal frequency division multiple access (OFDMA). It is a multicarrier technique in which the transmit spectrum is divided into K orthogonal subcarriers equally spaced in frequency. The method has been used for many years in both wireline broadband communications and wireless local area networks (WLAN). LTE-A provides a minimum of 1000 Mbps throughput in the downlink (DL) and 500 Mbps in the uplink (UL). The spectral bandwidth for LTE-A is 100 MHz, using up to five component carriers each with a component bandwidth of up to 20 MHz. LTE-A also includes support for both frequency domain duplexing and time domain duplexing.

LTE-A also employs multiple antenna methods such as spatial multiplexing and transmit diversity. Spatial multiplexing (SM) is a multiple-input-multiple-output system (MIMO) formulation enabled by configuring multiple antennas separated in space. The spatially separated antennas provide separate and distinct transmission channels allowing the transmitter-receiver pair to extract independent signals from each channel while cancelling interference from the other transmission paths. When combined, OFDMA and MIMO-SM provide orthogonality in both frequency and space. LTE-A supports up to eight antennas per modem.

Another application of a MIMO system configuration is to provide transmit diversity. Transmit diversity, as the name implies, enables the transmitter to send multiple copies of the same signal (or processed variations of the same signal) over several of the separate antenna paths available when the transmitting and receiving modems have more than one antenna. Wireless communications systems must contend with radio signal propagation impairments that include multipath fading, noise, and interference. Multipath fading results from a transmitted radio signal transversing many different paths from a transmitting antenna to a receiving antenna as a result of reflections from both man-made and natural environmental objects. The multiple reflected signals (including a possible line-of-sight signal) combine at the receiver to form a transmission path impulse response (with an associated transmission path frequency response). Depending on the characteristics of this response, it is possible for parts of the transmission channel to have deep nulls, which can be time-varying as a result of movement of the transmitter, the receiver, and the objects causing reflections. A wireless MIMO system has different transmission paths for its spatially separated antennas. The transmission path diversity increases the probability that the transmit signal can be correctly received at the decoder while some of the transmission paths are subject to harsh attenuation as a result of the multipath fading problem.

FIGS. 4-7 show some examples of MIMO system configuration. More specifically, FIG. 4 shows a single-input-single-output (SISO) system in a single cell for a single user between an LTE base station 410 and a user equipment 420. FIG. 5 shows a multiple input, single output (MISO) system in a single cell for a single user between an LTE base station 510 and a user equipment 520. FIG. 6 shows a MIMO system in a single cell for a single user between an LTE base station 610 and a user equipment 620. FIG. 7 shows a MIMO system, or interference, in a cooperative multi-cell environment for a single user between LTE base stations 710, 715 and user equipment 720, 725.

The description below provides background information on MIMO communications for OFDM.

Optimal multi-antenna formulation for OFDM spatial multiplexing, where there are M antenna to transmit signals and N antennas to receive signals, assumes that the duration of the time response of the channel is less than the OFDM cyclic prefix (CP), hence no inter-symbol interference (ISI), and is expressed as follows:

$$r=Hy+n$$

where:
  H=M×N MIMO channel frequency response matrix (M being the number of transmit antennas, N being the number of receive antennas);
  r=received frequency domain signal;
  y=precoder frequency domain output signal;
  n=noise; and
  s=detected frequency domain signal.

If OFDM, the FFT (receiver demodulator) and IFFT (transmit modulator) provide transformation of signals between the time domain and frequency domain. The MIMO channel formulation is used to model the channel response from the frequency domain signal in the transmitter to the frequency domain signal in the receiver.

Channel diagonalization via the well-known singular value decomposition (SVD) can be expressed as follows:

$$H=SVD(H)=UDV^H$$

where U, V are unitary eigenvector matrices and D is a diagonal eigenvalue matrix. Several well established methods and algorithms are available in text books and papers to calculate the SVD.

Further, with respect to the following expression:

$$r=UDV^Hy+n$$

it is assigned that y=Vx and s=$U^H$r as the (modified) transmit and receive signals, respectively, where x is the precoder input signal. This provides the following:

$$S=U^Hr=U^HUDV^HVx+U^Hn$$

$$s=Dx+U^Hn$$

Since D is diagonal, the antenna channels are now orthogonalized and spatial interference is removed from the received signal s. The singular values are the square roots of the non-zero eigenvalues of $HH^H$ with rank≤min(M,N). Given that U is unitary, the noise variance of the orthogonalized system is unchanged with no noise enhancement. Accordingly, the optimal MIMO solution for spatial multiplexing can be expressed as follows:

$$V=\text{precoder}, U^H=\text{equalizer}$$

The description below provides background information on transmit diversity schemes.

Ordinarily, maximum ratio combining (MRC) receivers are used; however, in LTE space frequency block codes are used. A block code is defined for 2 transmit antennas and 4 transmit antennas, respectively, and the following pertains to the LTE block code definitions thereof.

In the case of 2 antenna ports, p∈E {0,1}, the frequency domain output $y(i)=[y^{(0)}(i)y^{(1)}(i)]^T$, where $i=0, 1, \ldots, M_{symb}^{ap}-1$ is the carrier index, of the transmitter precoding operation is defined by the following expression:

$$\begin{bmatrix} y^{(0)}(2i) \\ y^{(1)}(2i) \\ y^{(0)}(2i+1) \\ y^{(1)}(2i+1) \end{bmatrix} = \frac{1}{\sqrt{2}} \begin{bmatrix} 1 & 0 & j & 0 \\ 0 & -1 & 0 & j \\ 0 & 1 & 0 & j \\ 1 & 0 & -j & 0 \end{bmatrix} \begin{bmatrix} Re(x^{(0)}(i)) \\ Re(x^{(1)}(i)) \\ Im(x^{(0)}(i)) \\ Im(x^{(1)}(i)) \end{bmatrix}$$

for $i=0, 1, \ldots, M_{symb}^{layer}-1$ with $M_{symb}^{ap}=2M_{symb}^{layer}$, where $M_{symb}^{layer}$ is the number of symbols per layer, and $M_{symb}^{ap}$ is the number of symbol per antenna port.

The superscript for $y^{(p)}(\ )$ indicates the antenna port number {0,1}. The operators Re( ) and Im( ) refer to the real and imaginary components of the complex precoder input signal $x^{(p)}(i)$. For the case of two antenna ports, there are two input signals, and the span of the precoder covers two adjacent frequency domain carriers using two antenna ports. The transmit precoder generates the IFFT modulator input signal in the frequency domain.

The precoding operation can be rewritten showing permutation and modification of the two transmit symbols $x^{(0)}(i)$ and $x^{(1)}(i)$ on the two antenna ports using adjacent frequency carriers as follows:

$$\begin{bmatrix} y^{(0)}(2i) \\ y^{(1)}(2i) \\ y^{(0)}(2i+1) \\ y^{(1)}(2i+1) \end{bmatrix} = \frac{1}{\sqrt{2}} \begin{bmatrix} x^{(0)}(i) \\ -conj(x^{(1)}(i)) \\ x^{(1)}(i) \\ conj(x^{(0)}(i)) \end{bmatrix}$$

where the conj( ) operator refers to the complex conjugate of $x^{(p)}(i)$.

In the case of 4 antenna ports, p∈{0, 1, 2, 3}, the output $y(i)=[y^{(0)}(i)y^{(1)}(i)y^{(2)}(i)y^{(3)}(i)]^T$, $i=0, 1, \ldots, M_{symb}^{ap}-1$, of the transmitter precoding operation is defined by the following expression:

$$\begin{bmatrix} y^{(0)}(4i) \\ y^{(1)}(4i) \\ y^{(2)}(4i) \\ y^{(3)}(4i) \\ y^{(0)}(4i+1) \\ y^{(1)}(4i+1) \\ y^{(2)}(4i+1) \\ y^{(3)}(4i+1) \\ y^{(0)}(4i+2) \\ y^{(1)}(4i+2) \\ y^{(2)}(4i+2) \\ y^{(3)}(4i+2) \\ y^{(0)}(4i+3) \\ y^{(1)}(4i+3) \\ y^{(2)}(4i+3) \\ y^{(3)}(4i+3) \end{bmatrix} =$$

$$\frac{1}{\sqrt{2}} \begin{bmatrix} 1 & 0 & 0 & 0 & j & 0 & 0 & 0 \\ 0 & 0 & 0 & 0 & 0 & 0 & 0 & 0 \\ 0 & -1 & 0 & 0 & 0 & j & 0 & 0 \\ 0 & 0 & 0 & 0 & 0 & 0 & 0 & 0 \\ 0 & 1 & 0 & 0 & 0 & j & 0 & 0 \\ 0 & 0 & 0 & 0 & 0 & 0 & 0 & 0 \\ 1 & 0 & 0 & 0 & -j & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 1 & 0 & 0 & 0 & j & 0 \\ 0 & 0 & 0 & 0 & 0 & 0 & 0 & 0 \\ 0 & 0 & 0 & -1 & 0 & 0 & 0 & j \\ 0 & 0 & 0 & 0 & 0 & 0 & 0 & 0 \\ 0 & 0 & 0 & 1 & 0 & 0 & 0 & j \\ 0 & 0 & 0 & 0 & 0 & 0 & 0 & 0 \\ 0 & 0 & 1 & 0 & 0 & 0 & -j & 0 \end{bmatrix} \begin{bmatrix} Re(x^{(0)}(i)) \\ Re(x^{(1)}(i)) \\ Re(x^{(2)}(i)) \\ Re(x^{(3)}(i)) \\ Im(x^{(0)}(i)) \\ Im(x^{(1)}(i)) \\ Im(x^{(2)}(i)) \\ Im(x^{(3)}(i)) \end{bmatrix}$$

for $i = 0, 1, \ldots, M_{symb}^{layer} - 1$ with $$M_{symb}^{ap} = \begin{cases} 4M_{symb}^{layer} & \text{if } M_{symb}^{(0)} \bmod 4 = 0 \\ (4M_{symb}^{layer})-2 & \text{if } M_{symb}^{(0)} \bmod 4 \neq 0. \end{cases}$$

Once again, $y^{(p)}(i)$ indicates the transmitter precoding output signal for antenna p on carrier i as simply permutation and modification of the transmitted symbols $x^{(q)}(j)$. The precoder output feeds the IFFT input in the frequency domain.

SUMMARY

Various embodiments of transmit diversity decoding algorithms are described herein. The algorithms may be implemented in software, firmware, hardware, or any combination thereof. Furthermore, in order to simplify the description, it is assumed that in all cases an LTE-A receiver of the type shown in FIG. 2 is configured to present a channelization framework. This allows us to consider the frequency domain MIMO channel system formulation from the frequency domain signal at the precoder in the far end transmitter to the frequency domain signal at the FFT demodulator output in the receiver.

According to one aspect, a method may receive a first input that includes signals transmitted by M transmit antennas on C channels and received by N receive antennas, where M, N and C is each a positive integer greater than 1. The method may also receive a second input that includes estimates of channel matrix elements. Various methods are available to calculate channel matrix elements. Each channel matrix element h(i,j), given as the matrix element of the channel matrix H, represents the transmission response in the frequency domain from the $i^{th}$ transmit antenna to the $j^{th}$ receiver antenna, generalized to include any possible filtering introduced by the modem either by analog or digital methods. Under this assumption, channel matrix elements can be considered to be frequency scaling factors for the direct transmission channel and the interference channels. Training reference signals are defined in the LTE signal and resource structure that facilitate this calculation. These methods are well-known to those skilled in the art of LTE modem design. The method may further generate an output that includes at least an estimate of a transmit signal transmitted by one of the M transmit antennas on one of the C channels based at least in part on the first and the second inputs.

According to another aspect, a processor comprises a MIMO channel estimation module and a MIMO receiver processing module. The MIMO channel estimation module may generate estimates of channel matrix elements with respect to C channels, C being a positive integer greater than 1. The MIMO receiver processing module, coupled to the MIMO channel estimation module, may receive a first input that includes signals transmitted by M transmit antennas on the C channels and received by N receive antennas, where M and N is each a positive integer greater than 1. The MIMO receiver processing module may also receive, from the MIMO channel estimation module, a second input that includes the estimates of channel matrix elements with respect to C channels. The MIMO receiver processing module may further generate an output that includes at least an estimate of a transmit signal transmitted by one of the M transmit antennas on one of the C channels based at least in part on the first and the second inputs.

According to a further aspect, a computer-readable medium may have a set of computer-executable instructions stored thereon. The instructions, when executed by one or more processors, may cause the one or more processors to perform operations comprising: receiving a first input that includes signals transmitted by M transmit antennas on C channels and received by N receive antennas, M, N and C each being a positive integer greater than 1; receiving a second input that includes estimates of channel matrix elements; and generating an output that includes at least an estimate of a transmit signal transmitted by one of the M transmit antennas on one of the C channels based at least in part on the first and the second inputs.

Thus, a robust and ideal decoder that implements one or more of the proposed algorithms may be developed for the transmit diversity scheme defined in the LTE standard.

BRIEF DESCRIPTION OF THE DRAWINGS

The present disclosure will become more readily apparent to those ordinarily skilled in the art after reviewing the following detailed description and accompanying drawings.

DETAILED DESCRIPTION OF THE PREFERRED EMBODIMENTS

Overview

Figure 1:
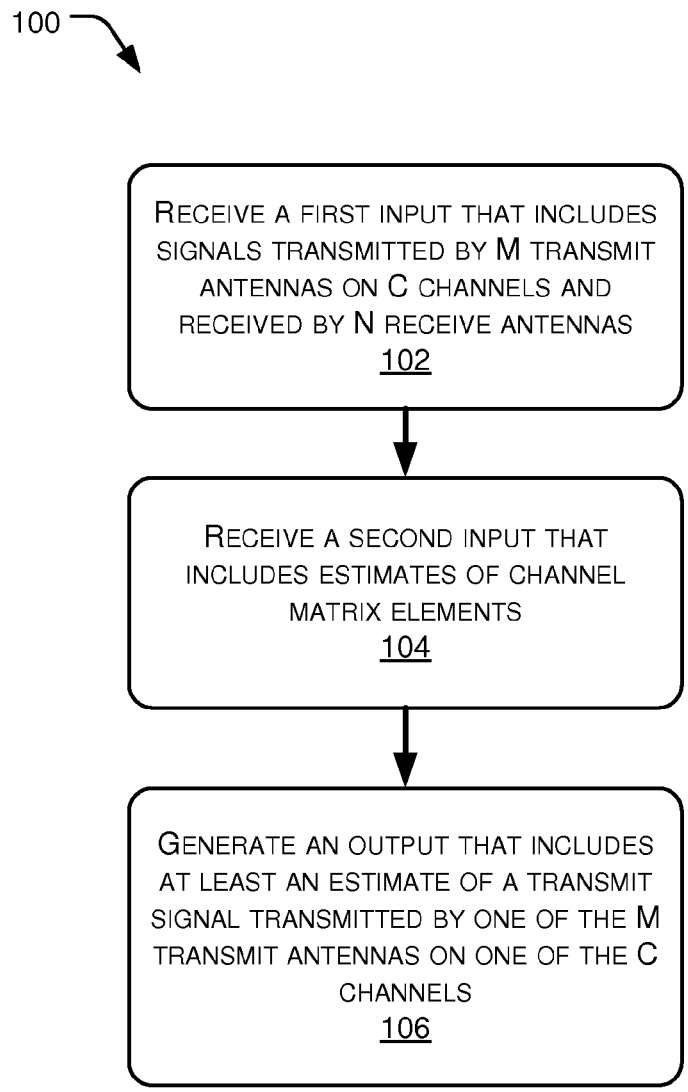
FIG. 1 is a flowchart of a transmit diversity decoding process in accordance with an embodiment of the present disclosure.

The proposed scheme uses diversity in the transmitter, i.e., the transmission of identical, similar, or otherwise closely correlated signals, on appropriately spaced antennas, in order to compensate for the frequency selective fading in the transmission signal path from the transmitter side to the receiver side. The transmission path varies with time as the transmitter, receiver, and the environment change. This variation results in a time-varying channel frequency response, which may produce deep spectral nulls. In a single antenna transmission scheme, there is only one signal and one signal path. A deep null under such circumstances would prevent reliable signal recovery at the receiver.

Under the proposed transmit diversity scheme, multiple, i.e., different, signal paths from the transmitter side to the receiver side are configured such that one or more of the multiple signal paths would provide an acceptable signal-to-noise ratio (SNR) and allow robust recovery of the transmit signal in a channel environment which may contain channel nulls or fades. That is, the techniques of the proposed scheme provide robust and ideal decoders for the transmit diversity scheme defined in the LTE standard. In the detailed description that follows, a respective decoder for each of three different M×N transmit diversity cases is provided, where M denotes the number of transmit antennas and N denotes the number of receive antennas. A proof for each case demonstrating that each decoder provides ideal signal recovery regardless of the channel matrix is also provided.

Exemplary 2×2 Transmit Diversity Case

In the expressions below, x=transmitter precoder input, y=transmitter precoder output, H=channel matrix, r=receive signal, and s=detected signal.

The precoder operation can be rewritten as follows:

$$\begin{bmatrix} y^{(0)}(2i) & y^{(0)}(2i+1) \\ y^{(1)}(2i) & y^{(1)}(2i+1) \end{bmatrix} = \begin{bmatrix} x(1) & x(2) \\ -x^*(2) & x^*(1) \end{bmatrix}$$

The $1/\sqrt{2}$ factor has been ignored since it just introduces power scaling. Two symbols are transmitted using two antennas and two adjacent carriers on each antenna. The received signals are expressed as follows, using a two-antenna port receiver:

$$\begin{bmatrix} r(1,1) & r(1,2) \\ r(2,1) & r(2,2) \end{bmatrix} = \begin{bmatrix} h(1,1) & h(1,2) \\ h(2,1) & h(2,2) \end{bmatrix} \begin{bmatrix} y^{(0)}(2i) & y^{(0)}(2i+1) \\ y^{(1)}(2i) & y^{(1)}(2i+1) \end{bmatrix}$$

where r(k,q)=the received signal on carrier (2i+q−1) and receiver port number (k−1) for $1 \le k \le 2$ and $1 \le q \le 2$ and The channel matrix is assumed to be ideal and the same for carrier frequencies 2i and 2i+1. The channel matrix elements are indicated as follows:

h(k,q)=the channel path transmission scaling factor in the frequency domain at carrier frequencies 2i, 2i+1, 2i+2, and 2i+3 for the port (q−1) transmitter to the port (k−1) receiver for $1 \le k \le 2$ and $1 \le q \le 2$ The 2×2 decoder solution for the two symbols is expressed below, with s(1) being the decoder estimate of x(1) and s(2) being the decoder estimate of x(2), the * superscript indicates the complex conjugate mathematical operation and the $|.|^2$ operation indicates the magnitude squared of the complex value:

$$s(1)=[h^*(1,1)r(1,1)+h(1,2)r^*(1,2)+h^*(2,1)r(2,1)+h(2,2)r^*(2,2)]/D$$

$$s^*(2)=[-h^*(1,2)r(1,1)+h(1,1)r^*(1,2)-h^*(2,2)r(2,1)+h(2,1)r^*(2,2)]/D$$

$$D=|h(1,1)|^2+|h(1,2)|^2+|h(2,1)|^2+|h(2,2)|^2$$

Here, s(2) is simply the complex conjugate of the result calculated above as s*(2), requiring only a sign change for the imaginary component. A block diagram of the 2×2 decoder is given in FIG. 8.

The proof below follows simple algebraic manipulation and substitution, and demonstrates that the 2×2 decoder provides ideal signal recovery regardless of the channel matrix. Beginning with the equation for the decoder estimate of the first symbol s(1) given by the present invention, the definition of the received signals for the 2×2 system r(.,.), the transmit symbols defined by LTE, and the channel matrix elements h(.,.):

$$s(1)=[h^*(1,1)r(1,1)+h(1,2)r^*(1,2)+h^*(2,1)r(2,1)+h(2,2)r^*(2,2)]/D$$

$$r(1,1)=h(1,1)y^{(0)}(2i)+h(1,2)y^{(1)}(2i)$$

$$r(1,2)=h(1,1)y^{(0)}(2i+1)+h(1,2)y^{(1)}(2i+1)$$

$$r(2,1)=h(2,1)y^{(0)}(2i)+h(2,2)y^{(1)}(2i)$$

$$r(2,2)=h(2,1)y^{(0)}(2i+1)+h(2,2)y^{(1)}(2i+1)$$

We substitute the received symbols into the equation for the symbol estimate as follows:

$$s(1)=\{h^*(1,1)[h(1,1)y^{(0)}(2i)+h(1,2)y^{(1)}(2i)]+h(1,2)[h^*(1,1)y^{(0)*}(2i+1)+h^*(1,2)y^{(1)*}(2i+1)]+h^*(2,1)[h(2,1)y^{(0)}(2i)+h(2,2)y^{(1)}(2i)]+h(2,2)[h^*(2,1)y^{(0)*}(2i+1)+h^*(2,2)y^{(1)*}(2i+1)]\}/D$$

Simplify using the algebraic distributive property:

$$s(1)=\{h^*(1,1)h(1,1)y^{(0)}(2i)+h^*(1,1)h(1,2)y^{(1)}(2i)+h(1,2)h^*(1,1)y^{(0)*}(2i+1)+h(1,2)h^*(1,2)y^{(1)*}(2i+1)+h^*(2,1)h(2,1)y^{(0)*}(2i+1)+h^*(2,1)h(2,2)y^{(1)}(2i)]+h(2,2)h^*(2,1)y^{(0)*}(2i+1)+h(2,2)h^*(2,2)y^{(1)*}(2i+1)]\}/D$$

Next recognize that $|h(i,j)|^2=h(i,j)h^*(i,j)$:

$$s(1)=\{|h(1,1)|^2y^{(0)}(2i)+h^*(1,1)h(1,2)y^{(1)}(2i)+h(1,2)h^*(1,1)y^{(0)*}(2i+1)+|h(1,2)|^2y^{(1)*}(2i+1)+|h(2,1)|^2y^{(0)}(2i)+h^*(2,1)h(2,2)y^{(1)}(2i)+h(2,2)h^*(2,1)y^{(0)*}(2i+1)+|h(2,2)|^2y^{(1)*}(2i+1)]\}/D$$

Now notice the following definitions, substitute, and simplify:

$$y^{(0)}(2i)=x(1)$$

$$y^{(1)}(2i)=-x^*(2)$$

$$y^{(0)*}(2i+1)=x^*(2)$$

$$y^{(1)*}(2i+1)=x(1)$$

$$s(1)=\{|h(1,1)|^2x(1)-h^*(1,1)h(1,2)x^*(2)+h(1,2)h^*(1,1)x^*(2)+|h(1,2)|^2x(1)+|h(2,1)|^2x(1)-h^*(2,1)h(2,2)x^*(2)+h(2,2)h^*(2,1)x^*(2)+|h(2,2)|^2x(1)]\}/D$$

$$s(1)=\{|h(1,1)|^2x(1)+|h(1,2)|^2x(1)+|h(2,1)|^2x(1)+|h(2,2)|^2x(1)]\}/D$$

$$s(1)=x(1)[|h(1,1)|^2+|h(1,2)|^2x(1)+|h(2,1)|^2+|h(2,2)|^2]/D=x(1)D/D$$

$$\rightarrow s(1)=x(1)$$

This completes the proof that the 2×2 system decoder estimate of the first symbol s(1) is the actual transmitted symbol x(1), given the correct channel matrix estimate H. Now consider the decoder estimate for the second symbol:

$$s^*(2)=[-h^*(1,2)r(1,1)+h(1,1)r^*(1,2)-h^*(2,2)r(2,1)+h(2,1)r^*(2,2)]/D$$

Again, following the same method to establish a proof for this second symbol, we show the equations for the received signals as a function of the transmitted signals and the channel matrix elements:

$$r(1,1)=h(1,1)y^{(0)}(2i)+h(1,2)y^{(1)}(2i)=h(1,1)x(1)-h(1,2)x^*(2)$$

$$r(1,2)=h(1,1)y^{(0)}(2i+1)+h(1,2)y^{(1)}(2i+1)=h(1,1)x(2)+h(1,2)x^*(1)$$

$$r(2,1)=h(2,1)y^{(0)}(2i)+h(2,2)y^{(1)}(2i)=h(2,1)x(1)-h(2,2)x^*(2)$$

$$r(2,2)=h(2,1)y^{(0)}(2i+1)+h(2,2)y^{(1)}(2i+1)=h(2,1)x(2)+h(2,2)x^*(1)$$

Substitute these expressions into the equation for the symbol estimate:

$$s^*(2)=\{-h^*(1,2)[h(1,1)x(1)-h(1,2)x^*(2)]+h(1,1)[h^*(1,1)x^*(2)+h^*(1,2)x(1)]-h^*(2,2)[h(2,1)x(1)-h(2,2)x^*(2)]+h(2,1)[h^*(2,1)x^*(2)+h^*(2,2)x(1)]\}/D$$

Apply the distributive property and simplify:

$$s^*(2)=[-h^*(1,2)h(1,1)x(1)+h^*(1,2)h(1,2)x^*(2)+h(1,1)h^*(1,1)x^*(2)+h(1,1)h^*(1,2)x(1)-h^*(2,2)h(2,1)x(1)+h^*(2,2)h(2,2)x^*(2)+h(2,1)h^*(2,1)x^*(2)+h(2,1)h^*(2,2)x(1)]/D$$

$$s^*(2)=[h^*(1,2)h(1,2)x^*(2)+h(1,1)h^*(1,1)x^*(2)+h^*(2,2)h(2,2)x^*(2)+h(2,1)h^*(2,1)x^*(2)]/D$$

$$s^*(2)=[|h(1,2)|^2x^*(2)+|h(1,1)|^2x^*(2)+|h(2,2)|^2x^*(2)+|h(2,1)|^2x^*(2)]/D$$

$$s^*(2)=x^*(2)[|h(1,2)|^2+|h(1,1)|^2+|h(2,2)|^2+|h(2,1)|^2]/D$$

$$s^*(2)=x^*(2)D/D=x^*(2)$$

$$\rightarrow s(2)=x(2)$$

This completes the proof showing that the decoder estimate for the second symbol is equal to the actual transmitted symbol, given the proper channel matrix estimate.

Exemplary 4×2 Transmit Diversity Case

In the expressions below, x=precoder input, y=precoder output, H=channel matrix, r=receive signal, and s=detected signal.

The precoder operation can be rewritten as follows:

$$\begin{bmatrix} y^{(0)}(2i) & y^{(0)}(2i+1) & y^{(0)}(2i+2) & y^{(0)}(2i+3) \\ y^{(1)}(2i) & y^{(1)}(2i+1) & y^{(1)}(2i+2) & y^{(1)}(2i+3) \\ y^{(2)}(2i) & y^{(2)}(2i+1) & y^{(2)}(2i+2) & y^{(2)}(2i+3) \\ y^{(3)}(2i) & y^{(3)}(2i+1) & y^{(3)}(2i+2) & y^{(3)}(2i+3) \end{bmatrix} =$$

$$\begin{bmatrix} x(1) & x(2) & 0 & 0 \\ 0 & 0 & x(3) & x(4) \\ -x^*(2) & x^*(1) & 0 & 0 \\ 0 & 0 & -x^*(4) & x^*(3) \end{bmatrix}$$

Four symbols are transmitted using four antennas and four adjacent carriers on each antenna. The received signals are expressed as follows, using four adjacent carriers and two receiver antenna ports:

$$\begin{bmatrix} r(1,1) & r(1,2) & r(1,3) & r(1,4) \\ r(2,1) & r(2,2) & r(2,3) & r(2,4) \end{bmatrix} = \begin{bmatrix} h(1,1) & h(1,2) & h(1,3) & h(1,4) \\ h(2,1) & h(2,2) & h(2,3) & h(2,4) \end{bmatrix}$$

$$\begin{bmatrix} y^{(0)}(2i) & y^{(0)}(2i+1) & y^{(0)}(2i+2) & y^{(0)}(2i+3) \\ y^{(1)}(2i) & y^{(1)}(2i+1) & y^{(1)}(2i+2) & y^{(1)}(2i+3) \\ y^{(2)}(2i) & y^{(2)}(2i+1) & y^{(2)}(2i+2) & y^{(2)}(2i+3) \\ y^{(3)}(2i) & y^{(3)}(2i+1) & y^{(3)}(2i+2) & y^{(3)}(2i+3) \end{bmatrix}$$

where $r(k,q)$=the received signal on carrier $(2i+q-1)$ and receiver port number $(k-1)$ for $1 \le k \le 2$ and $1 \le q \le 4$.

The channel matrix is assumed to be ideal and the same for carrier frequencies $2i$, $2i+1$, $2i+2$ and $2i+3$. The channel matrix elements are indicated as follows:

$h(k,q)$=the channel path transmission scaling factor in the frequency domain at carrier frequencies $2i$, $2i+1$, $2i+2$, and $2i+3$ for the port $(q-1)$ transmitter to the port $(k-1)$ receiver for $1 \le k \le 2$ and $1 \le q \le 4$.

The 4×2 decoder solution for four symbols is expressed below, with $s(1)$ being the decoder estimate of $x(1)$, . . . , and $s(4)$ being the decoder estimate of $x(4)$:

$s(1)=[h^*(1,1)r(1,1)+h(1,3)r^*(1,2)+h^*(2,1)r(2,1)+h(2,3)r^*(2,2)]/D(1)$ $s^*(2)=[-h^*(1,3)r(1,1)+h(1,1)r^*(1,2)-h^*(2,3)r(2,1)+h(2,1)r^*(2,2)]/D(1)$ $s(3)=[h^*(1,2)r(1,3)+h(1,4)r^*(1,4)+h^*(2,2)r(2,3)+h(2,4)r^*(2,4)]/D(2)$ $s^*(4)=[-h^*(1,4)r(1,3)+h(1,2)r^*(1,4)-h^*(2,4)r(2,3)+h(2,2)r^*(2,4)]/D(2)$ $D(1)=|h(1,1)|^2+|h(1,3)|^2+|h(2,1)|^2+|h(2,3)|^2$ $D(2)=|h(1,2)|^2+|h(1,4)|^2+|h(2,2)|^2+|h(2,4)|^2$

Figure 8:
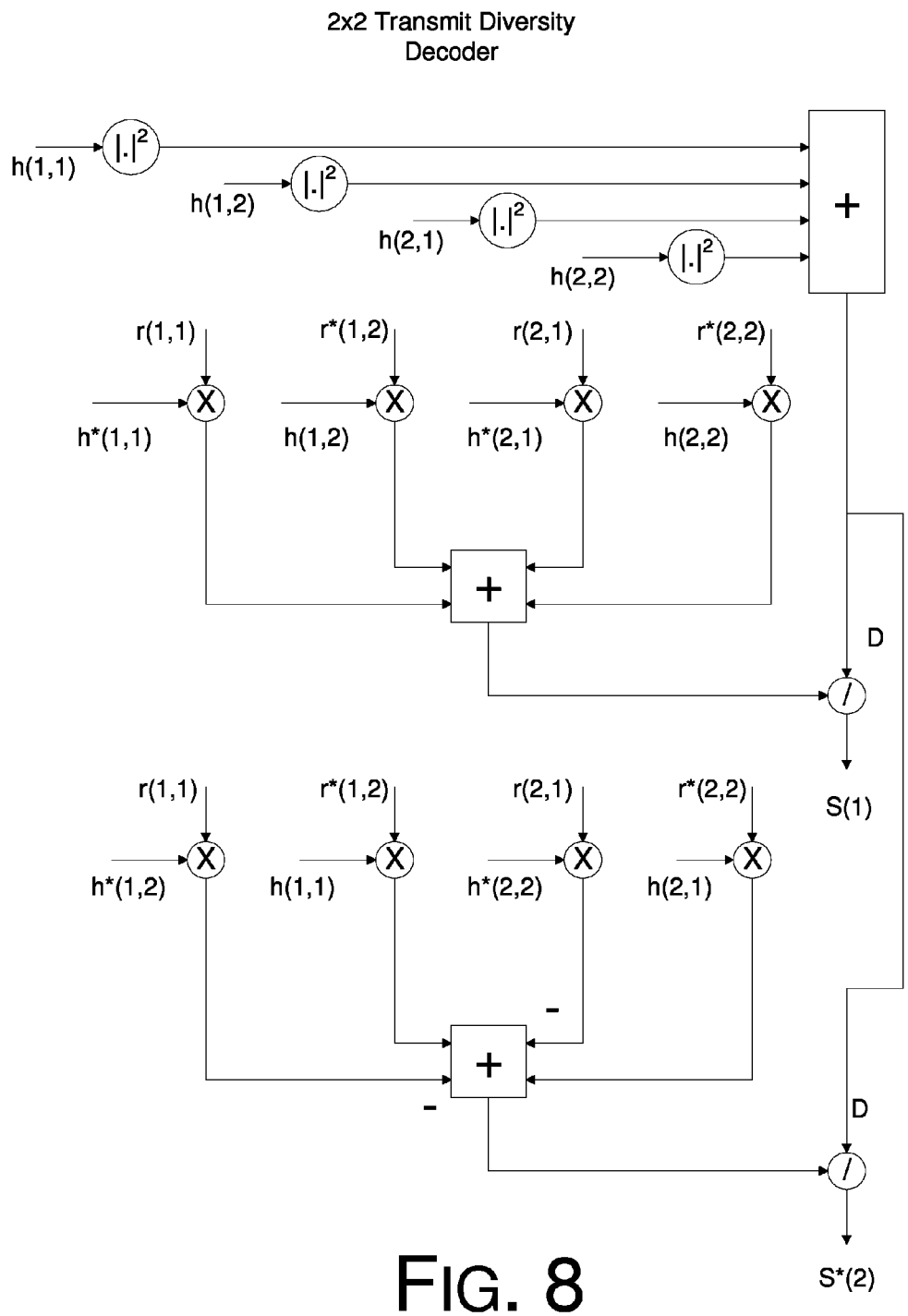
FIG. 8 is a block diagram of a 2×2 transmit diversity decoder.
Figure 9:
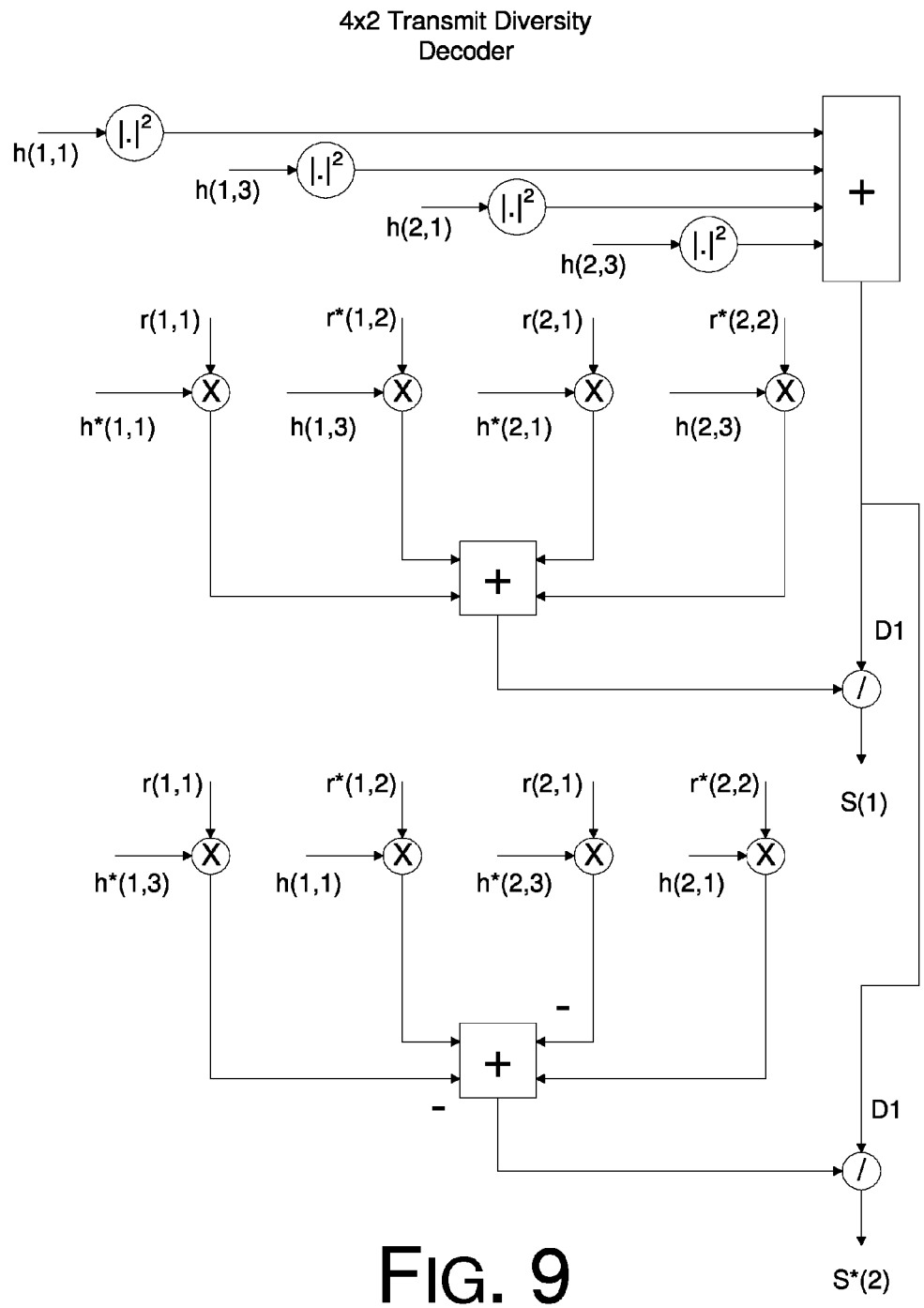
FIGS. 9 and 10 show block diagrams of a 4×2 transmit diversity decoder.
Figure 10:
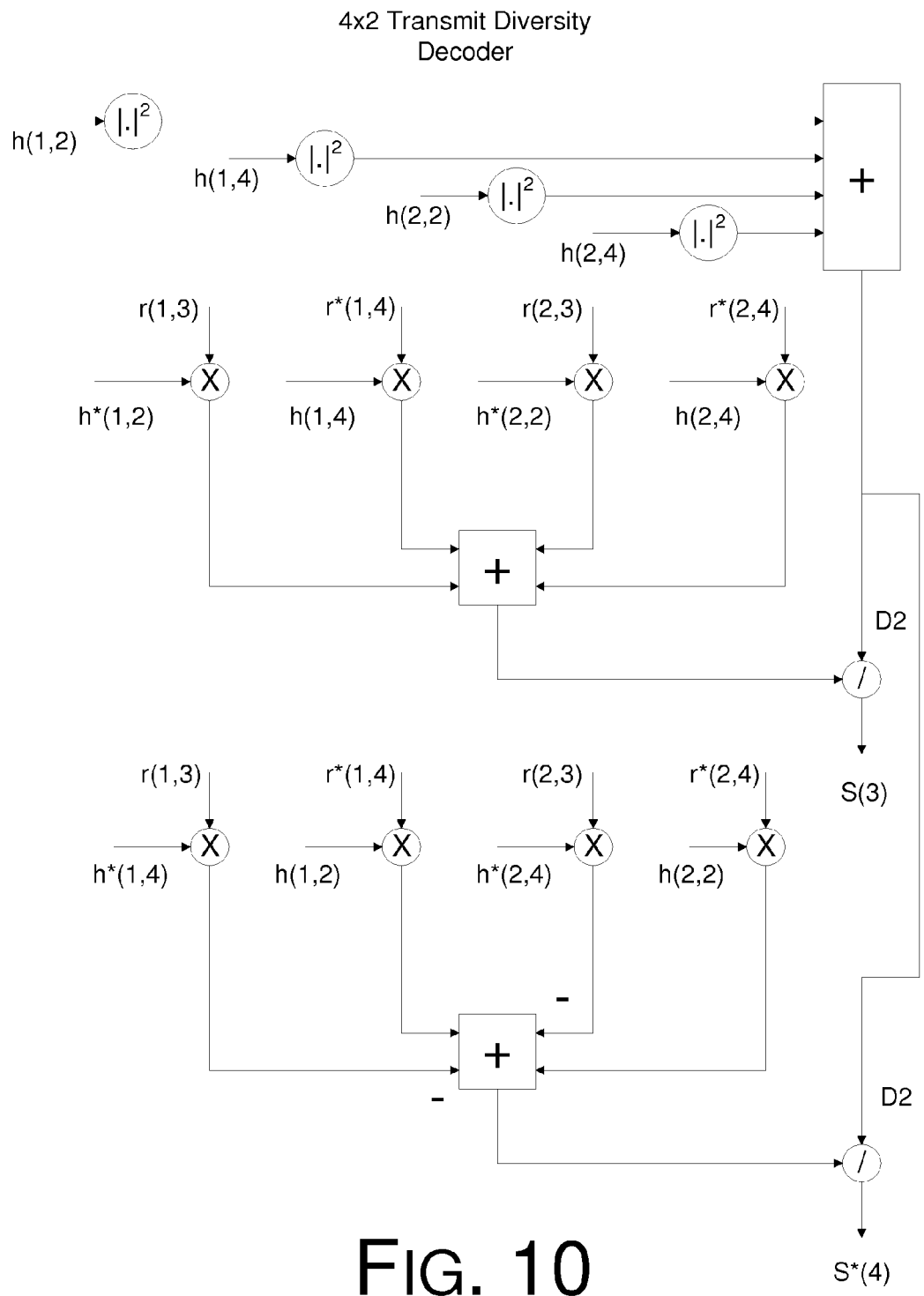
Figure 11:
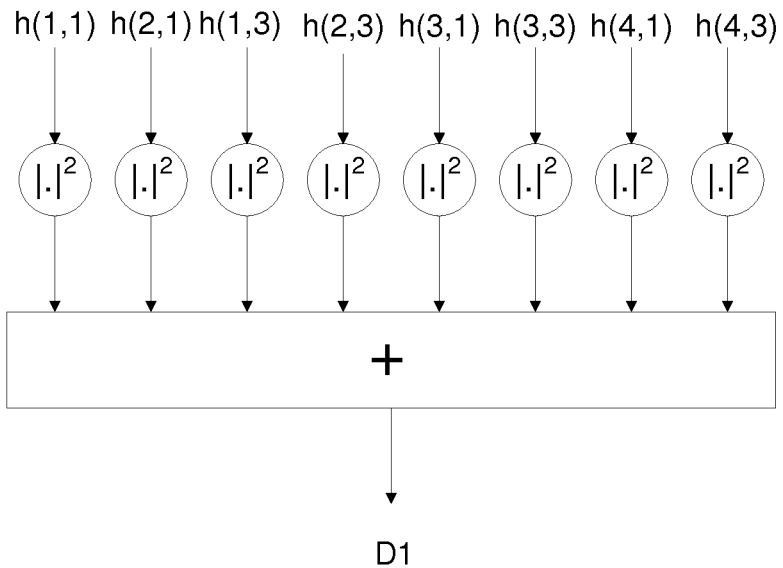
FIGS. 11, 12, 13, 14, and 15 show block diagrams of a 4×4 transmit diversity decoder.
Figure 11:
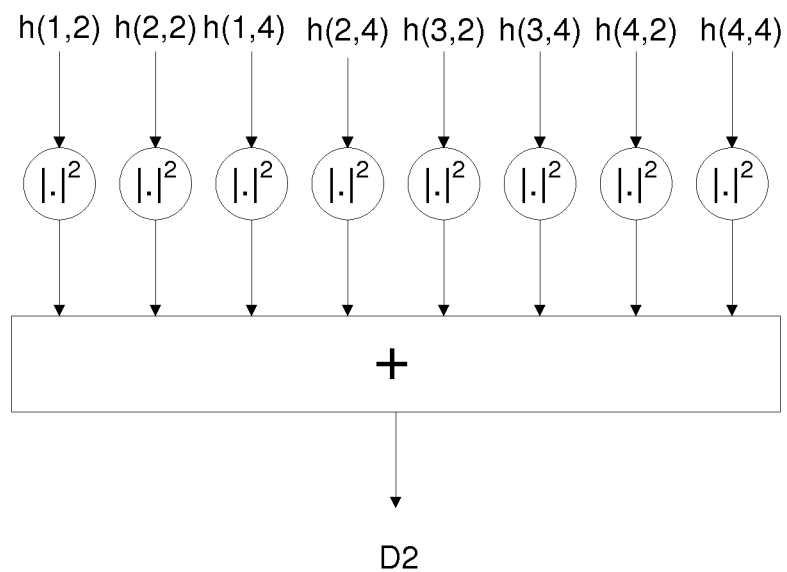
Figure 12:
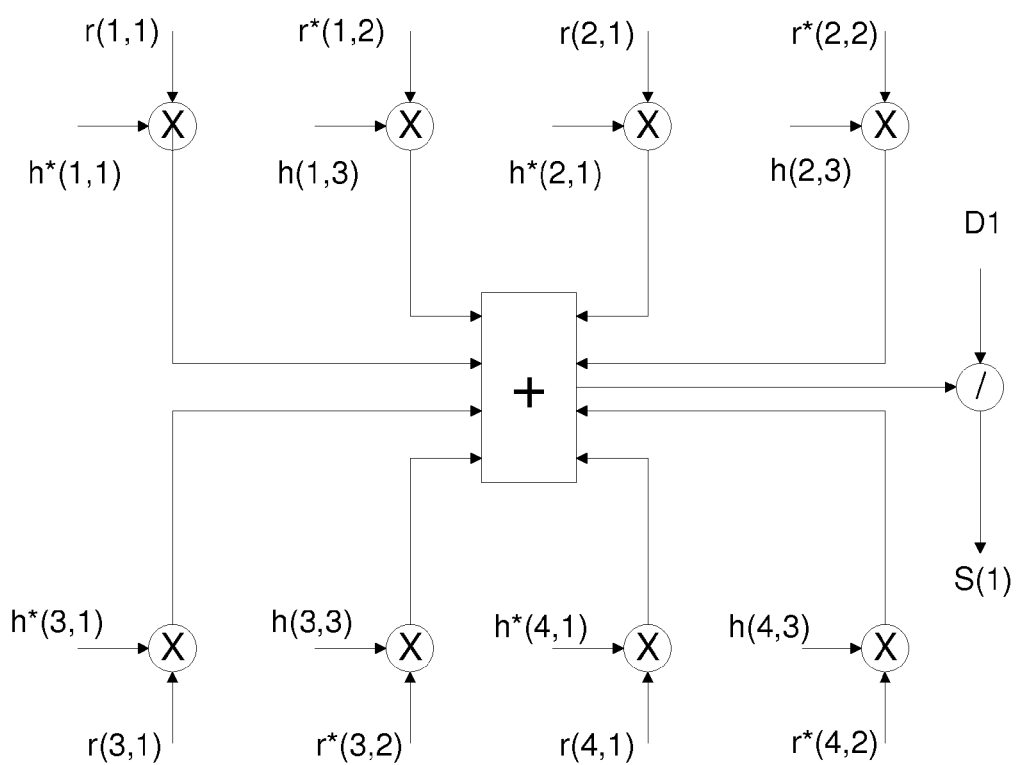
Figure 13:
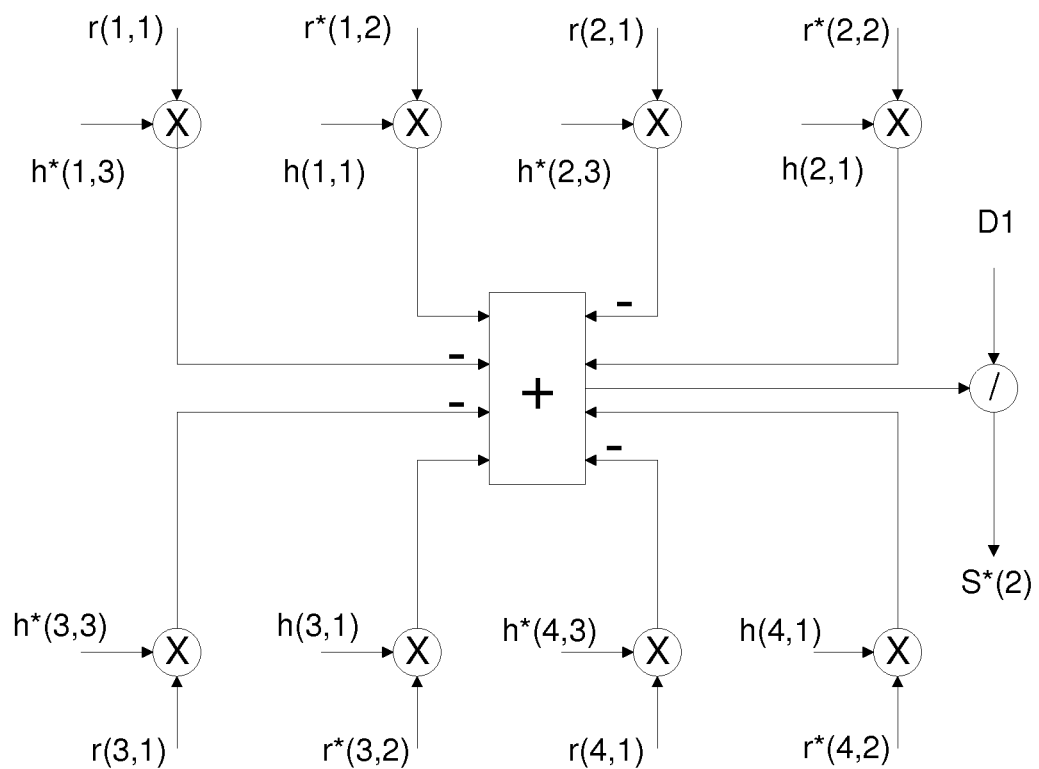
Figure 14:
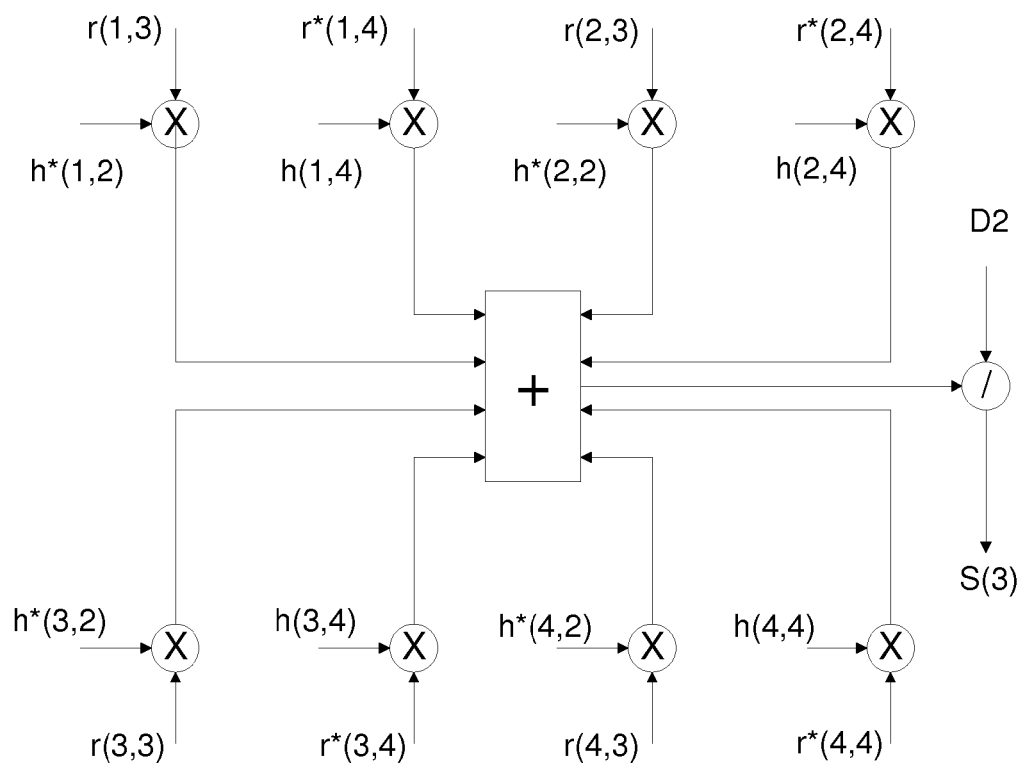
Figure 15:
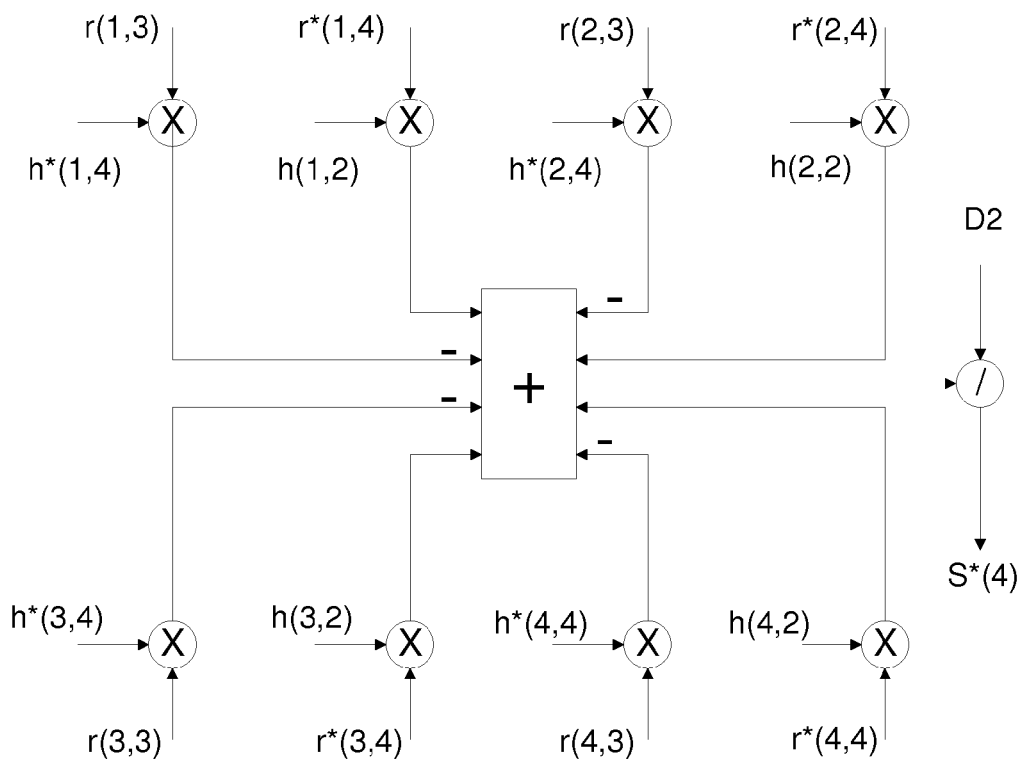

The block diagram for the 4×2 transmit diversity decoder is a straight forward extension of the block diagram shown in FIG. 8 for the 2×2 system, extended for the additional terms with the appropriate modifications indicated by the equations, and is shown in FIGS. 9 and 10.

The proof below follows simple algebraic substitution and manipulation, and demonstrates that the 4×2 decoder provides ideal signal recovery regardless of the channel matrix. Start with:

$s(1)=[h^*(1,1)r(1,1)+h(1,3)r^*(1,2)+h^*(2,1)r(2,1)+h(2,3)r^*(2,2)]/D(1)$

The received signals for the 4×2 system follow as:

$r(1,1)=h(1,1)x(1)-h(1,3)x^*(2)$ $r(1,2)=h(1,1)x(2)+h(1,3)x^*(1)$ $r(2,1)=h(2,1)x(1)-h(2,3)x^*(2)$ $r(2,2)=h(2,1)x(2)+h(2,3)x^*(1)$

Substitution and simplification follow:

$s(1)=\{h^*(1,1)[h(1,1)x(1)-h(1,3)x^*(2)]+h(1,3)[h^*(1,1)x^*(2)+h^*(1,3)x(1)]+h^*(2,1)[h(2,1)x(1)-h(2,3)x^*(2)]+h(2,3)[h^*(2,1)x^*(2)+h^*(2,3)x(1)]\}/D(1)$

Apply the distributive property and simplify as follows:

$s(1)=[h^*(1,1)h(1,1)x(1)-h^*(1,1)h(1,3)x^*(2)+h(1,3)h^*(1,1)x^*(2)+h(1,3)h^*(1,3)x(1)+h^*(2,1)h(2,1)x(1)-h^*(2,1)h(2,3)x^*(2)+h(2,3)h^*(2,1)x^*(2)+h(2,3)h^*(2,3)x(1)]/D(1)$ $s(1)=[|h(1,1)|^2x(1)+|h(1,3)|^2x(1)+|h(2,1)|^2x(1)+|h(2,3)|^2x(1)]/D(1)$

Complete the proof for the first symbol:

$\rightarrow s(1)=x(1)$

Consider the estimate for the second symbol and follow the same method for the proof:

$s^*(2)=[-h^*(1,3)r(1,1)+h(1,1)r^*(1,2)-h^*(2,3)r(2,1)+h(2,1)r^*(2,2)]/D(1)$ $s^*(2)=[-h^*(1,3)[h(1,1)x(1)-h(1,3)x^*(2)]+h(1,1)[h^*(1,1)x^*(2)+h^*(1,3)x(1)]-h^*(2,3)[h(2,1)x(1)-h(2,3)x^*(2)]+h(2,1)[h^*(2,1)x^*(2)+h^*(2,3)x(1)]]/D(1)$ $s^*(2)=[-h^*(1,3)h(1,1)x(1)+h^*(1,3)h(1,3)x^*(2)+h(1,1)h^*(1,1)x^*(2)+h(1,1)h^*(1,3)x(1)-h^*(2,3)h(2,1)x(1)+h^*(2,3)h(2,3)x^*(2)+h(2,1)h^*(2,1)x^*(2)+h(2,1)h^*(2,3)x(1)]/D(1)$ $s^*(2)=[|h(1,3)|^2x^*(2)+|h(1,1)|^2x^*(2)+|h(2,3)|^2x^*(2)+|h(2,1)|^2x^*(2)]/D(1)$ $\rightarrow s(2)=x(2)$ This completes the proof for the second symbol. Now consider the third symbol and once again follow the same approach as above:

$s(3)=[h^*(1,2)r(1,3)+h(1,4)r^*(1,4)+h^*(2,2)r(2,3)+h(2,4)r^*(2,4)]/D(2)$ $r(1,3)=h(1,2)x(3)-h(1,4)x^*(4)$ $r(1,4)=h(1,2)x(4)+h(1,4)x^*(3)$ $r(2,3)=h(2,2)x(3)-h(2,4)x^*(4)$ $r(2,4)=h(2,2)x(4)+h(2,4)x^*(3)$ $s(3)=[h^*(1,2)[h(1,2)x(3)-h(1,4)x^*(4)]+h(1,4)[h^*(1,2)x^*(4)+h^*(1,4)x(3)]+h^*(2,2)[h(2,2)x(3)-h(2,4)x^*(4)]+h(2,4)[h^*(2,2)x^*(4)+h^*(2,4)x(3)]]/D(2)$ $s(3)=[h^*(1,2)h(1,2)x(3)-h^*(1,2)h(1,4)x^*(4)+h(1,4)h^*(1,2)x^*(4)+h(1,4)h^*(1,4)x(3)+h^*(2,2)h(2,2)x(3)-h^*(2,2)h(2,4)x^*(4)+h(2,4)h^*(2,2)x^*(4)+h(2,4)h^*(2,4)x(3)]/D(2)$ $s(3)=[|h(1,2)|^2x(3)+|h(1,4)|^2x(3)+|h(2,2)|^2x(3)+|h(2,4)|^2x(3)]/D(2)$ $\rightarrow s(3)=x(3)$ This completes the proof for the third symbol. Now consider the forth symbol and once again follow the same approach as above:

$s^*(4)=[-h^*(1,4)r(1,3)+h(1,2)r^*(1,4)-h^*(2,4)r(2,3)+h(2,2)r^*(2,4)]/D(2)$ $s^*(4)=\{-h^*(1,4)[h(1,2)x(3)-h(1,4)x^*(4)]+h(1,2)[h^*(1,2)x^*(4)+h^*(1,4)x(3)]-h^*(2,4)[h(2,2)x(3)-h(2,4)x^*(4)]+h(2,2)[h^*(2,2)x^*(4)+h^*(2,4)x(3)]\}/D(2)$ $s^*(4)=\{-h^*(1,4)h(1,2)x(3)+h^*(1,4)h(1,4)x^*(4)+h(1,2)h^*(1,2)x^*(4)+h(1,2)h^*(1,4)x(3)-h^*(2,4)h(2,2)x(3)+h^*(2,4)h(2,4)x^*(4)+h(2,2)h^*(2,2)x^*(4)+h(2,2)h^*(2,4)x(3)]\}/D(2)$ $s*(4)=[|h(1,4)|^2x*(4)+|h(1,2)|^2x*(4)+|h(2,4)|^2x*(4)]+|h(2,2)|^2x*(4)]/D(2)$ $\rightarrow s(4)=x(4)$ This completes the proof for the third symbol.

Exemplary 4×4 Transmit Diversity Case

In the expressions below, x=precoder input, y=precoder output, H=channel matrix, r=receive signal, and s=detected signal.

The precoder operation can be rewritten as follows:

$$\begin{bmatrix} y^{(0)}(2i) & y^{(0)}(2i+1) & y^{(0)}(2i+2) & y^{(0)}(2i+3) \\ y^{(1)}(2i) & y^{(1)}(2i+1) & y^{(1)}(2i+2) & y^{(1)}(2i+3) \\ y^{(2)}(2i) & y^{(2)}(2i+1) & y^{(2)}(2i+2) & y^{(2)}(2i+3) \\ y^{(3)}(2i) & y^{(3)}(2i+1) & y^{(3)}(2i+2) & y^{(3)}(2i+3) \end{bmatrix} = $$

$$\begin{bmatrix} x(1) & x(2) & 0 & 0 \\ 0 & 0 & x(3) & x(4) \\ -x^*(2) & x^*(1) & 0 & 0 \\ 0 & 0 & -x^*(4) & x^*(3) \end{bmatrix}$$

Four symbols are transmitted using four antennas and four adjacent carriers on each antenna. The received signals are expressed as follows for four adjacent carriers and four receive antenna port:

$$\begin{bmatrix} r(1,1) & r(1,2) & r(1,3) & r(1,4) \\ r(2,1) & r(2,2) & r(2,3) & r(2,4) \\ r(3,1) & r(3,2) & r(3,3) & r(3,4) \\ r(4,1) & r(4,2) & r(4,3) & r(4,4) \end{bmatrix} = \begin{bmatrix} h(1,1) & h(1,2) & h(1,3) & h(1,4) \\ h(2,1) & h(2,2) & h(2,3) & h(2,4) \\ h(3,1) & h(3,2) & h(3,3) & h(3,4) \\ h(4,1) & h(4,2) & h(4,3) & h(4,4) \end{bmatrix}$$

$$\begin{bmatrix} y^{(0)}(2i) & y^{(0)}(2i+1) & y^{(0)}(2i+2) & y^{(0)}(2i+3) \\ y^{(1)}(2i) & y^{(1)}(2i+1) & y^{(1)}(2i+2) & y^{(1)}(2i+3) \\ y^{(2)}(2i) & y^{(2)}(2i+1) & y^{(2)}(2i+2) & y^{(2)}(2i+3) \\ y^{(3)}(2i) & y^{(3)}(2i+1) & y^{(3)}(2i+2) & y^{(3)}(2i+3) \end{bmatrix}$$

where r(k,q)=the received signal on carrier (2i+q−1) and receiver port number (k−1) for 1≤k≤4 and 1≤q≤4.

The channel matrix is assumed to be ideal and the same for carrier frequencies 2i, 2i+1, 2i+2 and 2i+3. The channel matrix elements are indicated as follows:

h(k,q)=the channel path transmission scaling factor in the frequency domain at carrier frequencies 2i, 2i+1, 2i+2, and 2i+3 for the port (q−1) transmitter to the port (k−1) receiver for 1 and 1

The 4×4 decoder estimate solution for four symbols is expressed below, with s(1) being the estimate of x(1), . . . , and s(4) being the estimate of x(4):

$s(1)=[h*(1,1)r(1,1)+h(1,3)r*(1,2)+h*(2,1)r(2,1)+h(2,3)r*(2,2)+h*(3,1)r(3,1)+h(3,3)r*(3,2)+h*(4,1)r(4,1)+h(4,3)r*(4,2)]/D(1)$ $s*(2)=[-h*(1,3)r(1,1)+h(1,1)r*(1,2)-h*(2,3)r(2,1)+h(2,1)r*(2,2)-h*(3,3)r(3,1)+h(3,1)r*(3,2)-h*(4,3)r(4,1)+h(4,1)r*(4,2)]/D(1)$ $s(3)=[h*(1,2)r(1,3)+h(1,4)r*(1,4)+h*(2,2)r(2,3)+h(2,4)r*(2,4)+h*(3,2)r(3,3)+h(3,4)r*(3,4)+h*(4,2)r(4,3)+h(4,4)r*(4,4)]/D(2)$ $s*(4)=[-h*(1,4)r(1,3)+h(1,2)r*(1,4)-h*(2,4)r(2,3)+h(2,2)r*(2,4)-h*(3,4)r(3,3)+h(3,2)r*(3,4)-h*(4,4)r(4,3)+h(4,2)r*(4,4)]/D(2)$ $D(1)=|h(1,1)|^2+|h(2,1)|^2+|h(1,3)||h(2,3)|^2+|h(3,1)|^2+|h(3,3)|^2+|h(4,1)|^2+|h(4,3)|^2$ $D(2)=|h(1,2)|^2+|h(2,2)|^2+|h(1,4)|^2+|h(2,4)|^2+|h(3,2)|^2+|h(3,4)|^2+|h(4,2)|^2+|h(4,4)|^2$

A block diagram for the 4×4 transmit diversity decoder is shown in FIGS. 11, 12, 13, 14, and 15.

The proof below follows simple algebraic manipulation, and demonstrates that the 4×4 decoder provides ideal signal recovery regardless of the channel matrix. The list of received signal equations below results from the matrix multiplication above using the equation for the precoder and the channel matrix operation:

$s(1)=[h*(1,1)r(1,1)+h(1,3)r*(1,2)+h*(2,1)r(2,1)+h(2,3)r*(2,2)+h*(3,1)r(3,1)+h(3,3)r*(3,2)+h*(4,1)r(4,1)+h(4,3)r*(4,2)]/D(1)$ $r(1,1)=h(1,1)x(1)-h(1,3)x*(2)$ $r(1,2)=h(1,1)x(2)+h(1,3)x*(1)$ $r(2,1)=h(2,1)x(1)-h(2,3)x*(2)$ $r(2,2)=h(2,1)x(2)+h(2,3)x*(1)$ $r(1,3)=h(1,2)x(3)-h(1,4)x*(4)$ $r(1,4)=h(1,2)x(4)+h(1,4)x*(3)$ $r(2,3)=h(2,2)x(3)-h(2,4)x*(4)$ $r(2,4)=h(2,2)x(4)+h(2,4)x*(3)$ $r(3,1)=h(3,1)x(1)-h(3,3)x*(2)$ $r(3,2)=h(3,1)x(2)+h(3,3)x*(1)$ $r(4,1)=h(4,1)x(1)-h(4,3)x*(2)$ $r(4,2)=h(4,1)x(2)+h(4,3)x*(1)$ $r(3,3)=h(3,2)x(3)-h(3,4)x*(4)$ $r(3,4)=h(3,2)x(4)+h(3,4)x*(3)$ $r(4,3)=h(4,2)x(3)-h(4,4)x*(4)$ $r(4,4)=h(4,2)x(4)+h(4,4)x*(3)$ $s(1)=\{h*(1,1)[h(1,1)x(1)-h(1,3)x*(2)]+h(1,3)[h*(1,1)x*(2)+h*(1,3)x(1)]+h*(2,1)[h(2,1)x(1)-h(2,3)x*(2)]+h(2,3)[h*(2,1)x*(2)+h*(2,3)x(1)]+h*(3,1)[h(3,1)x(1)-h(3,3)x*(2)]+h(3,3)[h*(3,1)x*(2)+h*(3,3)x(1)]+h*(4,1)[h(4,1)x(1)-h(4,3)x*(2)]+h(4,3)[h*(4,1)x*(2)+h*(4,3)x(1)]\}/D(1)$ $s(1)=[h*(1,1)h(1,1)x(1)-h*(1,1)h(1,3)x*(2)+h(1,3)h*(1,1)x*(2)+h(1,3)h*(1,3)x(1)+h*(2,1)h(2,1)x(1)-h*(2,1)h(2,3)x*(2)+h(2,3)h*(2,1)x*(2)+h(2,3)h*(2,3)x(1)+h*(3,1)h(3,1)x(1)-h*(3,1)h(3,3)x*(2)+h(3,3)h*(3,1)x*(2)+h(3,3)h*(3,3)x(1)+h*(4,1)h(4,1)x(1)-h*(4,1)h(4,3)x*(2)+h(4,3)h*(4,1)x*(2)+h(4,3)h*(4,3)x(1)]/D(1)$ $s(1)=[|h(1,1)|^2x(1)+|h(1,3)|^2x(1)+|h(2,1)|^2x(1)+|h(2,3)|^2x(1)+|h(3,1)|^2x(1)+|h(3,3)|^2x(1)|h(4,1)|^2x(1)+|h(4,3)|^2x(1)]/D(1)$ $\rightarrow s(1)=x(1)$ $s^*(2)=[-h^*(1,3)[h(1,1)x(1)-h(1,3)x^*(2)]+h(1,1)[h^*(1,1)x^*(2)+h^*(1,3)x(1)]-h^*(2,3)[h(2,1)x(1)-h(2,3)x^*(2)]+h(2,1)[h^*(2,1)x^*(2)+h^*(2,3)x(1)]-h^*(3,3)[h(3,1)x(1)-h(3,3)x^*(2)]+h(3,1)[h^*(3,1)x^*(2)+h^*(3,3)x(1)]-h^*(4,3)[h(4,1)x(1)-h(4,3)x^*(2)]+h(4,1)[h^*(4,1)x^*(2)+h^*(4,3)x(1)]]/D(1)$ $s^*(2)=[-h^*(1,3)h(1,1)x(1)+h^*(1,3)h(1,3)x^*(2)+h(1,1)h^*(1,1)x^*(2)+h(1,1)h^*(1,3)x(1)-h^*(2,3)h(2,1)x(1)+h^*(2,3)h(2,3)x^*(2)+h(2,1)h^*(2,1)x^*(2)+h(2,1)h^*(2,3)x(1)-h^*(3,3)h(3,1)x(1)+h^*(3,3)h(3,3)x^*(2)+h(3,1)h^*(3,1)x^*(2)+h(3,1)h^*(3,3)x(1)-h^*(4,3)h(4,1)x(1)+h^*(4,3)h(4,3)x^*(2)+h(4,1)h^*(4,1)x^*(2)+h(4,1)h^*(4,3)x(1)]/D(1)$ $s^*(2)=[|h(1,3)|^2x^*(2)+|h(1,1)|^2x^*(2)+|h(2,3)|^2x^*(2)+|h(2,1)|^2x^*(2)+|h(3,3)|^2x^*(2)+|h(3,1)|^2x^*(2)+|h(4,3)|^2x^*(2)+|h(4,1)|^2x^*(2)]/D(1)$ $\to s(2)=x(2)$ $s(3)=[h^*(1,2)[h(1,2)x(3)-h(1,4)x^*(4)]+h(1,4)[h^*(1,2)x^*(4)+h^*(1,4)x(3)]+h^*(2,2)[h(2,2)x(3)-h(2,4)x^*(4)]+h(2,4)[h^*(2,2)x^*(4)+h^*(2,4)x(3)]+h^*(3,2)[h(3,2)x(3)-h(3,4)x^*(4)]+h(3,4)[h^*(3,2)x^*(4)+h^*(3,4)x(3)]+h^*(4,2)[h(4,2)x(3)-h(4,4)x^*(4)]+h(4,4)[h^*(4,2)x^*(4)+h^*(4,4)x(3)]]/D(2)$ $s(3)=[h^*(1,2)h(1,2)x(3)-h^*(1,2)h(1,4)x^*(4)+h(1,4)h^*(1,2)x^*(4)+h(1,4)h^*(1,4)x(3)+h^*(2,2)h(2,2)x(3)-h^*(2,2)h(2,4)x^*(4)+h(2,4)h^*(2,2)x^*(4)+h(2,4)h^*(2,4)x(3)+h^*(3,2)h(3,2)x(3)-h^*(3,2)h(3,4)x^*(4)+h(3,4)h^*(3,2)x^*(4)+h(3,4)h^*(3,4)x(3)+h^*(4,2)h(4,2)x(3)-h^*(4,2)h(4,4)x^*(4)+h(4,4)h^*(4,2)x^*(4)+h(4,4)h^*(4,4)x(3)]/D(2)$ $s(3)=[|h(1,2)|^2x(3)+|h(1,4)|^2x(3)+|h(2,2)|^2x(3)+|h(2,4)|^2x(3)+|h(3,2)|^2x(3)+|h(3,4)|^2x(3)+|h(4,2)|^2x(3+|h(4,4)|^2x(3)]/D(2)$ $\to s(3)=x(3)$ $s^*(4)=[-h^*(1,4)[h(1,2)x(3)-h(1,4)x^*(4)]+h(1,2)[h^*(1,2)x^*(4)+h^*(1,4)x(3)]-h^*(2,4)[h(2,2)x(3)-h(2,4)x^*(4)]+h(2,2)[h^*(2,2)x^*(4)+h^*(2,4)x(3)]-h^*(3,4)[h(3,2)x(3)-h(3,4)x^*(4)]+h(3,2)[h^*(3,2)x^*(4)+h^*(3,4)x(3)]-h^*(4,4)[h(4,2)x(3)-h(4,4)x^*(4)]+h(4,2)[h^*(4,2)x^*(4)+h^*(4,4)x(3)]]/D(2)$ $s^*(4)=[-h^*(1,4)h(1,2)x(3)+h^*(1,4)h(1,4)x^*(4)+h(1,2)h^*(1,2)x^*(4)+h(1,2)h^*(1,4)x(3)-h^*(2,4)h(2,2)x(3)+h^*(2,4)h(2,4)x^*(4)+h(2,2)h^*(2,2)x^*(4)+h(2,2)h^*(2,4)x(3)-h^*(3,4)h(3,2)x(3)+h^*(3,4)h(3,4)x^*(4)+h(3,2)h^*(3,2)x^*(4)+h(3,2)h^*(3,4)x(3)-h^*(4,4)h(4,2)x(3)+h^*(4,4)h(4,4)x^*(4)+h(4,2)h^*(4,2)x^*(4)+h(4,2)h^*(4,4)x(3)]/D(2)$ $s^*(4)=[|h(1,4)|^2x^*(4)+|h(1,2)|^2x^*(4)+|h(2,4)|^2x^*(4)+|h(2,2)|^2x^*(4)+$ $|h(3,4)|^2x^*(4)+|h(3,2)|^2x^*(4)+|h(4,4)|^2x^*(4)+|h(4,2)|^2x^*(4)]/D(2)$ $\to s(4)=x(4)$ Exemplary Process FIG. 1 illustrates a flowchart of a transmit diversity decoding process 100 in accordance with an embodiment of the present disclosure. In one or more embodiments, one or more of the operations of the process 100 may be omitted, repeated, and/or performed in a different order. Accordingly, the specific arrangement of operations shown in FIG. 1 is not to be construed as limiting the scope of the technique.

The process 100 may begin at 102. At 102, the process receives a first input that includes signals transmitted by M transmit antennas on C channels and received by N receive antennas, where M, N and C is each a positive integer greater than 1. At 104, the process receives a second input that includes estimates of channel matrix elements. At 106, the process generates an output that includes an estimate of a transmit signal transmitted by all of the M transmit antennas on all of the C channels based at least in part on the first and the second inputs.

In one embodiment, generating an output that includes at least an estimate of a transmit signal transmitted by all of the M transmit antennas on all of the C channels comprises generating an output that includes a plurality of estimates of transmit signals transmitted by some or all of the M transmit antennas on some or all of the C channels.

In one embodiment, when M=2 and N=2, generating an output that includes at least an estimate of both transmit symbols transmitted by both of the 2 transmit antennas on all of the 4 channels comprises generating the output according to an algorithm expressed as follows:

$s(1)=[h^*(1,1)r(1,1)+h(1,2)r^*(1,2)+h^*(2,1)r(2,1)+h(2,2)r^*(2,2)]/D$ $s^*(2)=[-h^*(1,2)r(1,1)+h(1,1)r^*(1,2)-h^*(2,2)r(2,1)+h(2,1)r^*(2,2)]/D$ where
$D=|h(1,1)|^2+|h(1,2)|^2+|h(2,1)|^2+|h(2,2)|^2$ Here, s(1) is the decoder estimate of the transmitted symbol x(1), and s(2) is the decoder estimate of the transmitted symbol x(2). The channel matrix elements are given as h(i,j).

Figure 3:
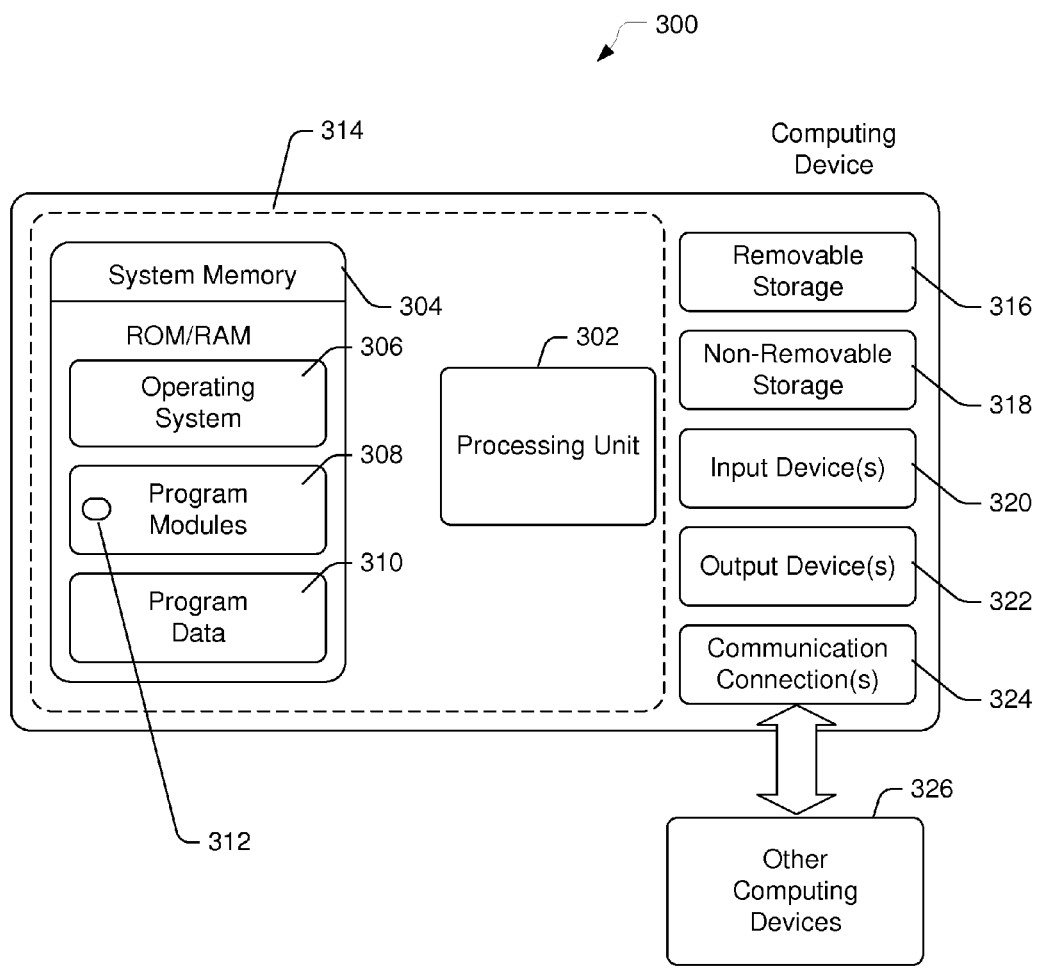
FIG. 3 is a block diagram of a computing device capable of implementing the transmit diversity decoding scheme in accordance with an embodiment of the present disclosure.
Figure 4:
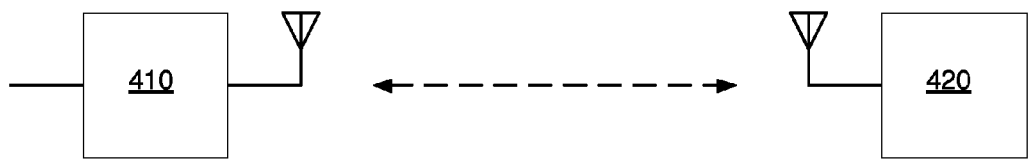
FIG. 4 is a block diagram of a single-input-single-output (SISO) system in a single cell for a single user.
Figure 5:
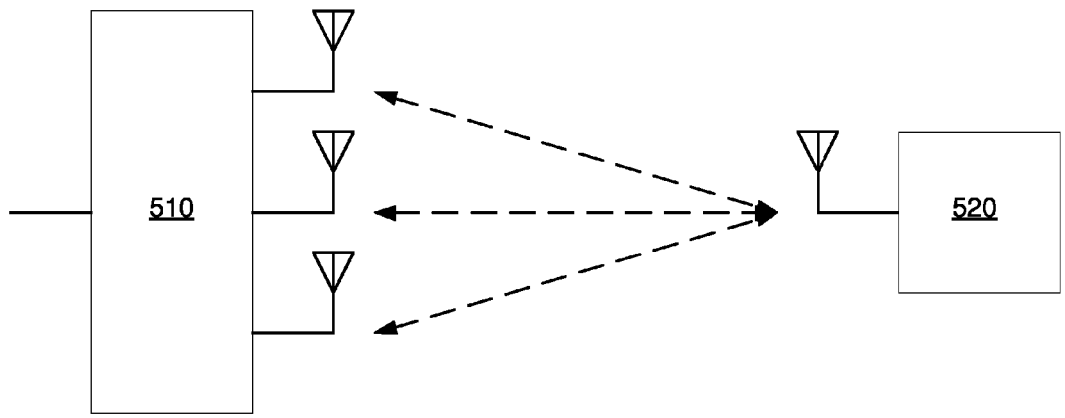
FIG. 5 is a block diagram of a multiple input, single output (MISO) system in a single cell for a single user.
Figure 6:
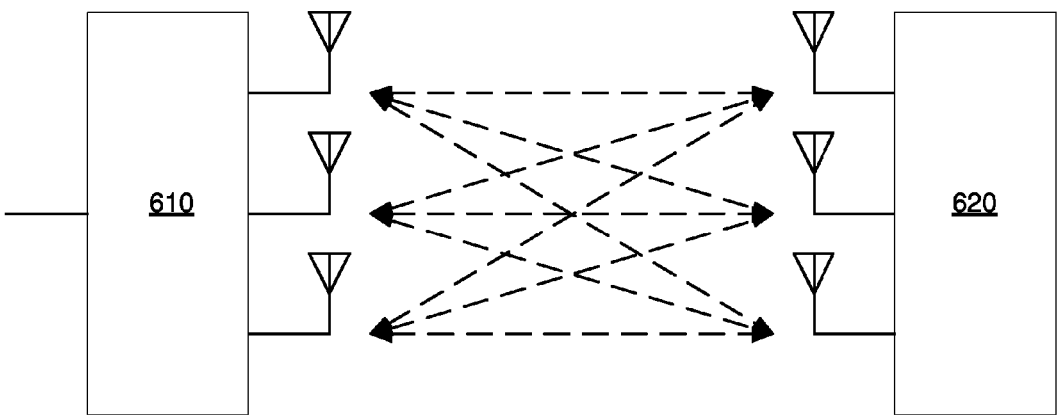
FIG. 6 is a block diagram of a MIMO system in a single cell for a single user.
Figure 7:
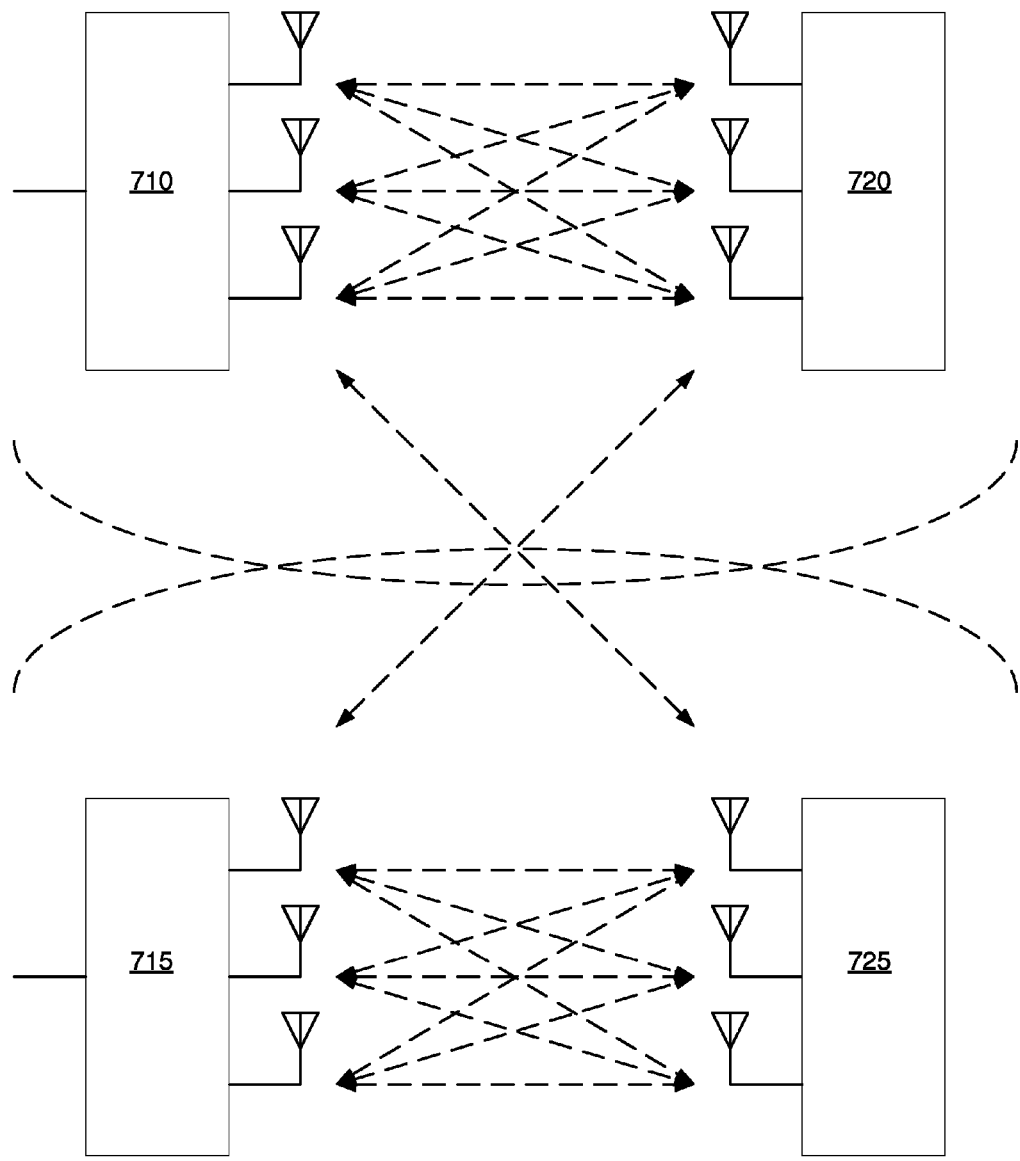
FIG. 7 is a block diagram of a MIMO system, or interference, in a cooperative multi-cell environment for a single user.

In one embodiment, when M=4 and N=2, generating an output that includes at least an estimate of all transmit symbols transmitted by all of the 4 transmit antennas on all of the 8 channels comprises generating the output according to an algorithm expressed as follows:

$s(1)=[h^*(1,1)r(1,1)+h(1,3)r^*(1,2)+h^*(2,1)r(2,1)+h(2,3)r^*(2,2)]/D(1)$ $s^*(2)=[-h^*(1,3)r(1,1)+h(1,1)r^*(1,2)-h^*(2,3)r(2,1)+h(2,1)r^*(2,2)]/D(1)$ $s(3)=[h^*(1,2)r(1,3)+h(1,4)r^*(1,4)+h^*(2,2)r(2,3)+h(2,4)r^*(2,4)]/D(2)$ $s^*(4)=[-h^*(1,4)r(1,3)+h(1,2)r^*(1,4)-h^*(2,4)r(2,3)+h(2,2)r^*(2,4)]/D(2)$ where
$D(1)=|h(1,1)|^2+|h(1,3)|^2+|h(2,1)|^2+|h(2,3)|^2$
$D(2)=|h(1,2)|^2+|h(1,4)|^2+|h(2,2)|^2+|h(2,4)|^2$ In one embodiment, when M=4 and N=4, generating an output that includes at least an estimate of all 4 transmit symbols transmitted by all of the 4 transmit antennas on all of the 16 channels comprises generating the output according to an algorithm expressed as follows:

$s(1)=[h^*(1,1)r(1,1)+h(1,3)r^*(1,2)+h^*(2,1)r(2,1)+h(2,3)r^*(2,2)+h^*(3,1)r(3,1)+h(3,3)r^*(3,2)+h^*(4,1)r(4,1)+h(4,3)r^*(4,2)]/D(1)$ $s^*(2)=[-h^*(1,3)r(1,1)+h(1,1)r^*(1,2)-h^*(2,3)r(2,1)+h(2,1)r^*(2,2)-h^*(3,3)r(3,1)+h(3,1)r^*(3,2)-h^*(4,3)r(4,1)+h(4,1)r^*(4,2)]/D(1)$ $s(3)=[h^*(1,2)r(1,3)+h(1,4)r^*(1,4)+h^*(2,2)r(2,3)+h(2,4)r^*(2,4)+h^*(3,2)r(3,3)+h(3,4)r^*(3,4)+h^*(4,2)r(4,3)+h(4,4)r^*(4,4)]/D(2)$ $s^*(4)=[-h^*(1,4)r(1,3)+h(1,2)r^*(1,4)-h^*(2,4)r(2,3)+h(2,2)r^*(2,4)-h^*(3,4)r(3,3)+h(3,2)r^*(3,4)-h^*(4,4)r(4,3)+h(4,2)r^*(4,4)]/D(2)$ where $D(1)=|h(1,1)|^2+|h(2,1)|^2+|h(1,3)|^2+|h(2,3)|^2+|h(3,1)|^2+|h(3,3)|^2+|h(4,1)|^2+|h(4,3)|^2$ $D(2)=|h(1,2)|^2+|h(2,2)|^2+|h(1,4)|^2+|h(2,4)|^2+|h(3,2)|^2+|h(3,4)|^2+|h(4,2)|^2+|h(4,4)|^2$ The process 100 or any variations thereof may be carried out as a result of executing computer-executable instructions, e.g., computer programming codes, stored on one or more non-transitory computer-readable medium, herein interchangeably referred to as computer-readable storage medium, by a processor, a central processing unit, a computing device such as, for example, the computing device 300 of FIG. 3. Such one or more computer-readable medium may be one or more tangible storage device including, but not limited to, random access memory (RAM), read-only memory (ROM), electrically erasable programmable read-only memory (EEPROM), flash memory or other memory technology, compact disc read-only memory (CD-ROM), digital versatile disks (DVD), any optical storage, magnetic cassettes, magnetic tape, magnetic disk storage or other magnetic storage devices, or any other non-transitory medium which can be used to store the desired information now known or later developed and which can be accessed by a processor, a central processing unit, a computing device such as, for example, the computing device 300 of FIG. 3. In the present disclosure, the term "one or more computer-readable medium" does not encompass any non-tangible or transitory propagating signal such as, for example, electromagnetic or acoustic signal or waveform and shall not be interpreted as such.

Illustrative Receiver

Figure 2:
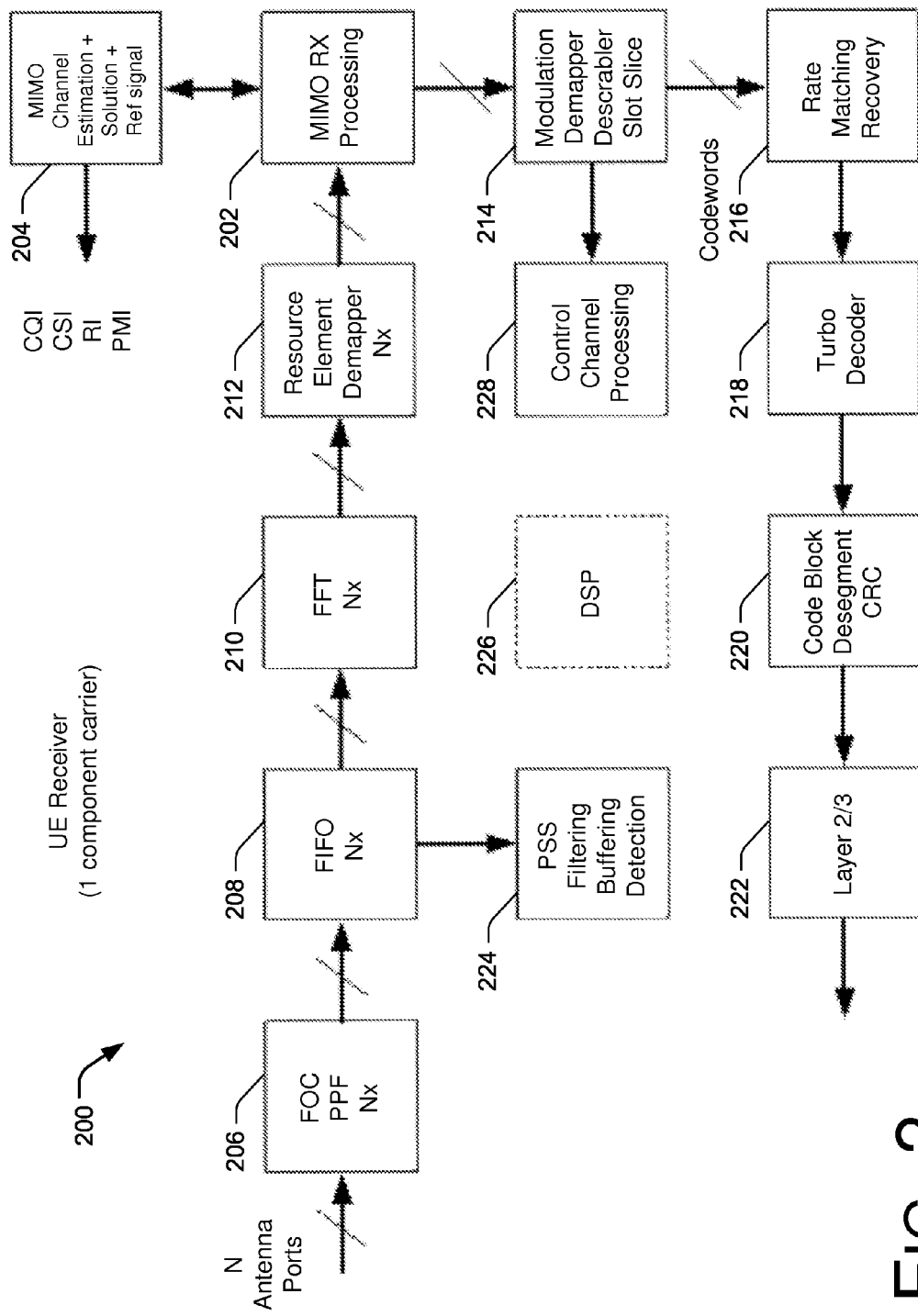
FIG. 2 is a block diagram of components a processor in a receiver capable of implementing the transmit diversity decoding scheme in accordance with the present disclosure.

FIG. 2 illustrates components of a processor 200 in a receiver that is capable of implementing the transmit diversity decoding scheme in accordance with the present disclosure, including the process 100 and any variation thereof. The components of the processor 200 depicted in FIG. 2 are for one component carrier. As the same design and operating principle described and depicted herein can be repeated and used for multiple component carriers, in the interest of brevity components for multiple component carriers will not be illustrated or described.

As shown in FIG. 2, the processor 200 comprises a MIMO receiver processing module 202 and a MIMO channel estimation module 204. The MIMO channel estimation module 204 is configured to generate estimates of channel matrix elements with respect to C channels, where C is a positive integer greater than 1. The MIMO receiver processing module 202 is coupled to the MIMO channel estimation module 204. The MIMO receiver processing module 202 is configured to receive a first input that includes signals transmitted by M transmit antennas on the C channels and received by N receive antennas, where M and N is each a positive integer greater than 1. The MIMO receiver processing module 202 is also configured to receive, from the MIMO channel estimation module, a second input that includes the estimates of channel matrix elements with respect to C channels. The MIMO receiver processing module 202 is further configured to generate an output that includes at least an estimate of a transmit signal transmitted by one of the M transmit antennas on one of the C channels based at least in part on the first and the second inputs.

The MIMO channel estimation module 204 calculates the transmission channel matrix by using a number of reference signals that are embedded in the signal and resource structure. The reference signals are known to the receiver and are interspersed in both time and frequency. For each carrier, wherever the reference signals are located on the time/frequency/antenna resource grid, the signal on all other antenna ports corresponding to the same time and frequency position is set to zero to eliminate interference from the other antennas. By doing so, the transmission path from the active transmit antenna port to all the possible receive antenna ports can be calculated. This allows calculation of all of the possible channel matrix elements from each transmitter port to each receiver port, completing the channel matrix.

The processor 200 may also comprise a frequency offset compensation (FOC) module 206, a first-in, first-out (FIFO) sample buffer 208, a fast Fourier transform (FFT) demodulator 210, a resource element demapper 212, a modulation demapping, descrambling and soft slicing module 214, a rate matching recovery module 216, a turbo decoder 218, a code block desegment cyclic redundancy check (CRC) module 220, a layer 2/3 processing module 222, a primary synchronization signal filtering, buffering and detection module 224.

The frequency offset compensation module 206 adjusts the sample timing of the receiver to match that of the far end transmitter. It does this by using a poly-phase filter with interpolated re-timing of the sampling process. It then branches to feed the primary synchronization signal filtering, buffering and detection module 224, which is a detection mechanism for the primary synchronization signal. The first-in, first-out (FIFO) sample buffer 208 is written with new samples as they are received, and the oldest samples are removed for further digital processing. Following the first-in, first-out (FIFO) sample buffer 208 is the fast Fourier transform demodulator 210. Multicarrier transmission schemes such as dual-mode transmitter (DMT) and OFDM use the inverse FFT as the signal modulator and the FFT as the demodulator. Following the fast Fourier transform demodulator 210 is the resource element demapper 212, which extracts data from specific locations across time and frequency, as allocated by a high level resource management algorithm.

At this point the MIMO processing functionality, which is partially covered by the material in this application, is addressed. The output of the MIMO receiver processing module 202 is fed to the modulation demapping, descrambling and soft slicing module 214, which handles modulation demapping, descrambling, and soft slicing to prepare the signal for the rate matching recovery module 216 and turbo decoder 218. The modulation demapping, descrambling and soft slicing module 214 also provides an output to a control channel processing module 228. Layer 2/3 processing follows. The processor 200 may further comprise a digital signal processor (DSP) 226 used to manage signal flow, hardware configuration, and simple calculations, and control channel processing machinery.

In one embodiment, the MIMO receiver processing module 202 is further configured to generate an output that includes a plurality of estimates of transmit signals transmitted by some or all of the M transmit antennas on some or all of the C channels.

In one embodiment, when M=2 and N=2, the MIMO receiver processing module 202 generates the output according to an algorithm expressed as follows:

$$s(1)=[h^*(1,1)r(1,1)+h(1,2)r^*(1,2)+h^*(2,1)r(2,1)+h(2,2)r^*(2,2)]/D$$

$$s^*(2)=[-h^*(1,2)r(1,1)+h(1,1)r^*(1,2)-h^*(2,2)r(2,1)+h(2,1)r^*(2,2)]/D$$

where $D=|h(1,1)|^2+|h(1,2)|^2+|h(2,1)|^2+|h(2,2)|^2$

In one embodiment, when M=4 and N=2, the MIMO receiver processing module 202 generates the output according to an algorithm expressed as follows:

$$s(1)=[h^*(1,1)r(1,1)+h(1,3)r^*(1,2)+h^*(2,1)r(2,1)+h(2,3)r^*(2,2)]/D(1)$$

$$s^*(2)=[-h^*(1,3)r(1,1)+h(1,1)r^*(1,2)-h^*(2,3)r(2,1)+h(2,1)r^*(2,2)]/D(1)$$

$$s(3)=[h^*(1,2)r(1,3)+h(1,4)r^*(1,4)+h^*(2,2)r(2,3)+h(2,4)r^*(2,4)]/D(2)$$

$$s^*(4)=[-h^*(1,4)r(1,3)+h(1,2)r^*(1,4)-h^*(2,4)r(2,3)+h(2,2)r^*(2,4)]/D(2)$$

where
$D(1)=|h(1,1)|^2+|h(1,3)|^2+|h(2,1)|^2+|h(2,3)|^2$
$D(2)=|h(1,2)|^2+|h(1,4)|^2+|h(2,2)|^2+|h(2,4)|^2$ In one embodiment, when M=4 and N=4, the MIMO receiver processing module 202 generates the output according to an algorithm expressed as follows:

$$s(1)=[h^*(1,1)r(1,1)+h(1,3)r^*(1,2)+h^*(2,1)r(2,1)+h(2,3)r^*(2,2)+h^*(3,1)r(3,1)+h(3,3)r^*(3,2)+h^*(4,1)r(4,1)+h(4,3)r^*(4,2)]/D(1)$$

$$s^*(2)=[-h^*(1,3)r(1,1)+h(1,1)r^*(1,2)-h^*(2,3)r(2,1)+h(2,1)r^*(2,2)-h^*(3,3)r(3,1)+h(3,1)r^*(3,2)-h^*(4,3)r(4,1)+h(4,1)r^*(4,2)]/D(1)$$

$$s(3)=[h^*(1,2)r(1,3)+h(1,4)r^*(1,4)+h^*(2,2)r(2,3)+h(2,4)r^*(2,4)+h^*(3,2)r(3,3)+h(3,4)r^*(3,4)+h^*(4,2)r(4,3)+h(4,4)r^*(4,4)]/D(2)$$

$$s^*(4)=[-h^*(1,4)r(1,3)+h(1,2)r^*(1,4)-h^*(2,4)r(2,3)+h(2,2)r^*(2,4)-h^*(3,4)r(3,3)+h(3,2)r^*(3,4)-h^*(4,4)r(4,3)+h(4,2)r^*(4,4)]/D(2)$$

where
$D(1)=|h(1,1)|^2+|h(2,1)|^2+|h(1,3)|^2+|h(2,3)|^2+|h(3,1)|^2+|h(3,3)|^2+|h(4,1)|^2+|h(4,3)|^2$
$D(2)=|h(1,2)|^2+|h(2,2)|^2+|h(1,4)|^2+|h(2,4)|^2+|h(3,2)|^2+|h(3,4)|^2+|h(4,2)|^2+|h(4,4)|^2$ Exemplary Computing Device FIG. 300 illustrates a representative computing device 300 that may implement the transmit diversity decoding scheme in accordance with an embodiment of the present disclosure. However, it will be readily appreciated that the techniques disclosed herein may be implemented in other computing devices, systems, and environments. The computing device 300 shown in FIG. 3 is only one example of a computing device and is not intended to suggest any limitation as to the scope of use or functionality of the computer and network architectures.

In at least one configuration, computing device 300 typically includes at least one processing unit 302 and system memory 304. Depending on the exact configuration and type of computing device, system memory 304 may be volatile (such as RAM), non-volatile (such as ROM, flash memory, etc.) or some combination thereof. System memory 304 may include an operating system 306, one or more program modules 308, and may include program data 310.

The computing device 300 is of a very basic configuration demarcated by a dashed line 314. Again, a terminal may have fewer components but may interact with a computing device that may have such a basic configuration.

In one embodiment, the program module 308 includes a transmit diversity decoding scheme module 312. The transmit diversity decoding scheme module 312 can carry out one or more functionalities and processes as described above with reference to FIGS. 1-2. For example, when the transmit diversity decoding scheme module 312 is properly configured, the computing device 300 can carry out the operations of process 100 of FIG. 1 and variations thereof.

Computing device 300 may have additional features or functionality. For example, computing device 300 may also include additional data storage devices (removable and/or non-removable) such as, for example, magnetic disks, optical disks, or tape. Such additional storage is illustrated in FIG. 3 by removable storage 316 and non-removable storage 318. Computer-readable storage media may include volatile and nonvolatile, removable and non-removable media implemented in any method or technology for storage of information, such as computer-executable instructions, data structures, program modules, or other data. System memory 304, removable storage 316 and non-removable storage 318 are all examples of computer storage media. Computer-readable storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 300. Any such computer storage media may be part of the computing device 300. Computing device 300 may also have input device(s) 320 such as keyboard, mouse, pen, voice input device, touch input device, etc. Output device(s) 322 such as a display, speakers, printer, etc. may also be included.

Computing device 300 may also contain communication connections 324 that allow the device to communicate with other computing devices 326, such as over a network. These networks may include wired networks as well as wireless networks. Communication connections 324 are some examples of communication media. Communication media may typically be embodied by computer readable instructions, data structures, program modules, etc.

It is appreciated that the illustrated computing device 300 is only one example of a suitable device and is not intended to suggest any limitation as to the scope of use or functionality of the various embodiments described. Other well-known computing devices, systems, environments and/or configurations that may be suitable for use with the embodiments include, but are not limited to personal computers, server computers, hand-held or laptop devices, multiprocessor systems, microprocessor-based systems, set top boxes, game consoles, programmable consumer electronics, network PCs, minicomputers, mainframe computers, distributed computing environments that include any of the above systems or devices, and/or the like.

CONCLUSION

The above-described techniques pertain to transmit diversity decoding. Although the techniques have been described in language specific to structural features and/or methodological acts, it is to be understood that the appended claims are not necessarily limited to the specific features or acts described. Rather, the specific features and acts are disclosed as exemplary forms of implementing such techniques. Those skilled in the art may make derivations and/or modifications of any of the disclosed embodiments or any variations thereof, and such derivations and modifications are still within the scope of the present disclosure.

What is claimed is:

1. A method, comprising:
receiving a first input that includes signals transmitted by M transmit antennas on C channels and received by N receive antennas, M, N and C each being a positive integer greater than 1;
receiving a second input that includes estimates of channel matrix elements; and
generating an output that includes at least an estimate of a transmit signal transmitted by one of the M transmit antennas on one of the C channels based at least in part on the first and the second inputs,
wherein, when M=2 and N=2, generating an output that includes at least an estimate of a transmit signal transmitted by one of the M transmit antennas on one of the C channels comprises generating the output according to an algorithm expressed as follows:

$$s(1)=[h^*(1,1)r(1,1)+h(1,2)r^*(1,2)+h^*(2,1)r(2,1)+h(2,2)r^*(2,2)]/D$$

$$s^*(2)=[-h^*(1,2)r(1,1)+h(1,1)r^*(1,2)-h^*(2,2)r(2,1)+h(2,1)r^*(2,2)]/D$$

wherein:

$$D=|h(1,1)|^2+|h(1,2)|^2+|h(2,1)|^2+|h(2,2)|^2$$

and wherein:
s=detected frequency domain signal;
s*=complex conjugate mathematical operation of s;
r(k,q)=the received signal on carrier (2i+q−1) and receiver port number (k−1) for 1≤k≤2 and 1≤q≤2; and
h(k,q)=the channel path transmission scaling factor in the frequency domain at carrier frequencies 2i, 2i+1, 2i+2, and 2i+3 for the port (q−1) transmitter to the port (k−1) receiver for 1≤k≤2 and 1≤q≤2.

2. The method as recited in claim 1, wherein generating an output that includes at least an estimate of a transmit signal transmitted by one of the M transmit antennas on one of the C channels comprises generating an output that includes a plurality of estimates of transmit signals transmitted by some or all of the M transmit antennas on some or all of the C channels.

3. A processor, comprising:
a multiple-input-multiple-output (MIMO) channel estimation module that generates estimates of channel matrix elements with respect to C channels, C being a positive integer greater than 1; and
a MIMO receiver processing module coupled to the MIMO channel estimation module, the MIMO receiver processing module configured to:
receive a first input that includes signals transmitted by M transmit antennas on the C channels and received by N receive antennas, M and N each being a positive integer greater than 1;
receive, from the MIMO channel estimation module, a second input that includes the estimates of channel matrix elements with respect to C channels; and
generate an output that includes at least an estimate of a transmit signal transmitted by one of the M transmit antennas on one of the C channels based at least in part on the first and the second inputs,
wherein, when M=2 and N=2, the MIMO receiver processing module generates the output according to an algorithm expressed as follows:

$$s(1)=[h^*(1,1)r(1,1)+h(1,2)r^*(1,2)+h^*(2,1)r(2,1)+h(2,2)r^*(2,2)]/D$$

$$s^*(2)=[-h^*(1,2)r(1,1)+h(1,1)r^*(1,2)-h^*(2,2)r(2,1)+h(2,1)r^*(2,2)]/D$$

wherein:

$$D=|h(1,1)|^2+|h(1,2)|^2+|h(2,1)|^2+|h(2,2)|^2$$

and wherein:
s=detected frequency domain signal;
s*=complex conjugate mathematical operation of s;
r(k,q)=the received signal on carrier (2i+q−1) and receiver port number (k−1) for 1≤k≤2 and 1≤q≤2; and
h(k,q)=the channel path transmission scaling factor in the frequency domain at carrier frequencies 2i, 2i+1, 2i+2, and 2i+3 for the port (q−1) transmitter to the port (k−1) receiver for 1≤k≤2 and 1≤q≤2.

4. The processor as recited in claim 3, wherein the MIMO receiver processing
module is further configured to generate an output that includes a plurality of estimates of transmit signals transmitted by some or all of the M transmit antennas on some or all of the C channels.

5. A non-transitory computer-readable medium having a set of computer-executable instructions stored thereon that, when executed by one or more processors, cause the one or more processors to perform operations comprising:
receiving a first input that includes signals transmitted by M transmit antennas on C channels and received by N receive antennas, M, N and C each being a positive integer greater than 1;
receiving a second input that includes estimates of channel matrix elements; and
generating an output that includes at least an estimate of a transmit signal transmitted by one of the M transmit antennas on one of the C channels based at least in part on the first and the second inputs,
wherein, when M=4 and N=4, generating an output that includes at least an estimate of a transmit signal transmitted by one of the M transmit antennas on
one of the C channels comprises generating the output according to an algorithm
expressed as:

$$s(1)=[h^*(1,1)r(1,1)+h(1,3)r^*(1,2)+h^*(2,1)r(2,1)+h(2,3)r^*(2,2)+h^*(3,1)r(3,1)+h(3,3)r^*(3,2)+h^*(4,1)r(4,1)+h(4,3)r^*(4,2)]/D(1)$$

$$s^*(2)=[-h^*(1,3)r(1,1)+h(1,1)r^*(1,2)-h^*(2,3)r(2,1)+h(2,1)r^*(2,2)-h^*(3,3)r(3,1)+h(3,1)r^*(3,2)-h^*(4,3)r(4,1)+h(4,1)r^*(4,2)]/D(1)$$

$$s(3)=[h^*(1,2)r(1,3)+h(1,4)r^*(1,4)+h^*(2,2)r(2,3)+h(2,4)r^*(2,4)+h^*(3,2)r(3,3)+h(3,4)r^*(3,4)+h^*(4,2)r(4,3)+h(4,4)r^*(4,4)]/D(2)$$

$$s^*(4)=[-h^*(1,4)r(1,3)+h(1,2)r^*(1,4)-h^*(2,4)r(2,3)+h(2,2)r^*(2,4)-h^*(3,4)r(3,3)+h(3,2)r^*(3,4)-h^*(4,4)r(4,3)+h(4,2)r^*(4,4)]/D(2)$$

wherein:

$$D(1)=|h(1,1)|^2+|h(2,1)|^2+|h(1,3)|^2|h(2,3)|^2+|h(3,1)|^2+|h(3,3)|^2+|h(4,1)|^2+|h(4,3)|^2$$

$$D(2)=|h(1,2)|^2+|h(2,2)|^2+|h(1,4)|^2+|h(2,4)|^2+|h(3,2)|^2+|h(3,4)|^2+|h(4,2)|^2+|h(4,4)|^2$$

and wherein:
s=detected frequency domain signal;
s*=complex conjugate mathematical operation of s;
r(k,q)=the received signal on carrier (2i+q−1) and receiver port number (k−1) for 1≤k≤4 and 1≤q≤4; and
h(k,q)=the channel path transmission scaling factor in the frequency domain at carrier frequencies 2i, 2i+1, 2i+2, and 2i+3 for the port (q−1) transmitter to the port (k−1) receiver for $1 \leq k \leq 4$ and $1 \leq q \leq 4$.

6. The non-transitory computer-readable medium as recited in claim 5, wherein generating an output that includes at least an estimate of a transmit signal transmitted by one of the M transmit antennas on one of the C channels comprises generating an output that includes a plurality of estimates of transmit signals transmitted by some or all of the M transmit antennas on some or all of the C channels.

* * * * *